(12) United States Patent
Kondo

(10) Patent No.: US 11,597,470 B2
(45) Date of Patent: *Mar. 7, 2023

(54) HUMAN-POWERED VEHICLE COMPONENT, MOBILE ELECTRONIC DEVICE, AND EQUIPMENT FOR HUMAN-POWERED VEHICLE

(71) Applicant: SHIMANO Inc., Sakai (JP)

(72) Inventor: Tomohiro Kondo, Sakai (JP)

(73) Assignee: Shimano Inc., Sakai (JP)

( * ) Notice: Subject to any disclaimer, the term of this patent is extended or adjusted under 35 U.S.C. 154(b) by 717 days.

This patent is subject to a terminal disclaimer.

(21) Appl. No.: 16/505,560

(22) Filed: Jul. 8, 2019

(65) Prior Publication Data

US 2020/0010144 A1    Jan. 9, 2020

(30) Foreign Application Priority Data

Jul. 9, 2018 (JP) .............................. JP2018-130244
Jul. 9, 2018 (JP) .............................. JP2018-130245
Jul. 9, 2018 (JP) .............................. JP2018-130246
Dec. 18, 2018 (JP) .............................. JP2018-236762

(51) Int. Cl.
*B62M 6/45* (2010.01)
*G05B 13/04* (2006.01)
*B62K 23/00* (2006.01)
*B62J 45/00* (2020.01)
*B62J 6/00* (2020.01)
*B62J 1/08* (2006.01)

(52) U.S. Cl.
CPC ................. *B62M 6/45* (2013.01); *B62J 6/00* (2013.01); *B62J 45/00* (2020.02); *B62K 23/00* (2013.01); *G05B 13/04* (2013.01); *B62J 2001/085* (2013.01)

(58) Field of Classification Search
CPC ..... B62M 6/45; B62J 6/00; B62J 45/00; B62J 2001/085; B62K 23/00; G05B 13/04
See application file for complete search history.

(56) References Cited

U.S. PATENT DOCUMENTS 5,274,801 A * 12/1993 Gordon .................... G06N 5/04
706/50
6,047,230 A *  4/2000 Spencer ................. B62M 9/123
474/70
6,682,087 B1    1/2004 Takeda
6,877,755 B2    4/2005 Takamoto
(Continued)

FOREIGN PATENT DOCUMENTS

CN    108313188 A  *  7/2018 ............. B62M 6/45
DE    102014007265 A1    11/2014
(Continued)

*Primary Examiner* — Dale W Hilgendorf
(74) *Attorney, Agent, or Firm* — Alleman Hall Creasman & Tuttle LLP

(57) ABSTRACT

A human-powered vehicle component includes an input device, to which first information related to at least one of a human-powered vehicle, a rider of the human-powered vehicle, and environment of the human-powered vehicle is input. The human-powered vehicle component further comprises an electric actuator and an artificial intelligence processor configured to generate second information for controlling the electric actuator in accordance with the first information input to the input device.

9 Claims, 9 Drawing Sheets

(56) References Cited

U.S. PATENT DOCUMENTS

| | | | |
|---|---|---|---|
| 6,917,283 B2 | 7/2005 | Takeda | |
| 7,399,244 B2 | 7/2008 | Takebayashi et al. | |
| 7,522,033 B2 | 4/2009 | Takamoto et al. | |
| 7,760,078 B2* | 7/2010 | Miki | B62K 23/02 340/432 |
| 7,902,967 B2* | 3/2011 | Takebayashi | B62M 25/08 340/432 |
| 8,655,561 B2* | 2/2014 | Kitamura | B62K 23/06 701/51 |
| 9,399,500 B1* | 7/2016 | Hashimoto | B62M 9/132 |
| 9,975,603 B2 | 5/2018 | Bortolozzo et al. | |
| 10,696,351 B2* | 6/2020 | Suzuki | G06N 5/04 706/50 |
| 2008/0114519 A1* | 5/2008 | DuFaux | B60T 7/16 701/70 |
| 2008/0276493 A1 | 11/2008 | Dunias | |
| 2015/0197308 A1 | 7/2015 | Butora et al. | |
| 2016/0001782 A1 | 1/2016 | Fiedler | |
| 2016/0075177 A1* | 3/2016 | Biderman | B60L 58/21 301/6.5 |
| 2016/0144928 A1 | 5/2016 | Chun | |
| 2017/0259879 A1 | 9/2017 | Southey et al. | |
| 2017/0282919 A1 | 10/2017 | Schieffelin | |
| 2018/0009508 A1* | 1/2018 | Suzuki | F16H 59/105 |
| 2018/0072373 A1 | 3/2018 | Kishita et al. | |
| 2018/0197401 A1 | 7/2018 | Khaligh et al. | |
| 2018/0232982 A1 | 8/2018 | Hsu et al. | |
| 2019/0126913 A1 | 5/2019 | Kinuhata et al. | |
| 2019/0202512 A1* | 7/2019 | Shen | B60N 2/16 |
| 2019/0315431 A1 | 10/2019 | Vijaya Kumar et al. | |
| 2020/0010137 A1* | 1/2020 | Komemushi | B62M 6/80 |
| 2020/0014321 A1* | 1/2020 | Kondo | B62J 45/40 |
| 2020/0014322 A1* | 1/2020 | Kondo | B62J 45/40 |
| 2020/0130771 A1 | 4/2020 | Jacobsz Rosier et al. | |
| 2020/0247498 A1* | 8/2020 | Yamamoto | B62J 45/411 |
| 2020/0410375 A1 | 12/2020 | Seagraves et al. | |
| 2021/0031848 A1 | 2/2021 | Du | |
| 2021/0147024 A1 | 5/2021 | Carlier | |
| 2021/0323622 A1 | 10/2021 | Shen et al. | |
| 2022/0016984 A1* | 1/2022 | Huang | B62M 6/45 |

FOREIGN PATENT DOCUMENTS

| | | |
|---|---|---|
| JP | 2002234479 A | 8/2002 |
| JP | 2008504857 A | 2/2008 |
| JP | 2012144061 A | 8/2012 |
| JP | 2012148580 A | 8/2012 |
| JP | 5960566 B2 | 8/2016 |
| JP | 2017522634 A | 8/2017 |
| WO | 2005058160 A1 | 6/2005 |
| WO | 2014029759 A1 | 2/2014 |
| WO | 2017093293 A1 | 6/2017 |
| WO | 2018059801 A1 | 4/2018 |

* cited by examiner

HUMAN-POWERED VEHICLE COMPONENT, MOBILE ELECTRONIC DEVICE, AND EQUIPMENT FOR HUMAN-POWERED VEHICLE

BACKGROUND ART

The present disclosure relates to a human-powered vehicle component, a mobile electronic device, and human-powered vehicle equipment.

Patent document 1 discloses an example of a human-powered vehicle component. The human-powered vehicle component executes various calculations in accordance with an output of a detector provided on the human-powered vehicle.

Patent Document 1: Japanese Laid-Open Patent Publication No. 2012-144061

SUMMARY

The human-powered vehicle component disclosed in patent document 1 executes various operations in accordance with predetermined conditions. However, the conditions and the control change depending on the user, the traveling environment, and the like.

One object of the present disclosure is to provide a human-powered vehicle component, a mobile electronic device, and human-powered vehicle equipment that improve usability.

A human-powered vehicle component in accordance with a first aspect of the present disclosure comprises an input device, to which first information related to at least one of a human-powered vehicle, a rider of the human-powered vehicle, and environment of the human-powered vehicle is input. The human-powered vehicle component further comprises an electric actuator and an artificial intelligence processor configured to generate second information for controlling the electric actuator in accordance with the first information input to the input device.

In accordance with the human-powered vehicle component of the first aspect, since the electric actuator is controlled by the second information generated by the artificial intelligence processor, the electric actuator is controlled in a preferred manner. This improves usability.

In accordance with a second aspect of the present disclosure, the human-powered vehicle component according to the first aspect is configured so that the second information includes at least one of information related to an automatic transmission, information related to an assist force for assisting propulsion of the human-powered vehicle, information related to a height of a saddle, information related to a state of a suspension, and information related to a brake.

In accordance with the human-powered vehicle component of the second aspect, the electric actuator is controlled in a preferred manner in accordance with at least one of the information related to the automatic transmission generated by the artificial intelligence processor, the information related to the assist force for assisting propulsion of the human-powered vehicle generated by the artificial intelligence processor, the information related to the height of the saddle generated by the artificial intelligence processor, the information related to the state of the suspension generated by the artificial intelligence processor, and the information related to the brake generated by the artificial intelligence processor.

In accordance with a third aspect of the present disclosure, the human-powered vehicle component according to the first or second aspect further comprises at least one of an electric transmission, a drive device for assisting propulsion of the human-powered vehicle, an electric adjustable seatpost, an electric suspension, and an electric brake device.

In accordance with the human-powered vehicle component of the third aspect, the artificial intelligence processor is provided on at least one of the electric transmission, the drive device, the electric adjustable seatpost, the electric suspension, and the electric brake device.

A human-powered vehicle component in accordance with a fourth aspect of the present disclosure comprises an input device to which first information related to at least one of a human-powered vehicle, a rider of the human-powered vehicle, and environment of the human-powered vehicle is input. The human-powered vehicle component further comprises an artificial intelligence processor configured to generate third information for controlling at least one of another human-powered vehicle component provided on the human-powered vehicle and a mobile electronic device carried by the rider of the human-powered vehicle in accordance with the first information input to the input device.

In accordance with the human-powered vehicle component of the fourth aspect, the other human-powered vehicle component and the mobile electronic device are controlled in accordance with the third information generated by the artificial intelligence processor. This improves usability.

In accordance with a fifth aspect of the present disclosure, the human-powered vehicle component according to the fourth aspect is configured so that the third information includes at least one of information related to an automatic transmission, information related to an assist force for assisting propulsion of the human-powered vehicle, information related to a height of a saddle, information related to a state of a suspension, information related to a brake, information related to a lamp, and information related to a content of a presentation that is presented to the rider of the human-powered vehicle.

In accordance with the human-powered vehicle component of the fifth aspect, the other human-powered vehicle component and the mobile electronic device are suitably controlled in accordance with at least one of the information related to the automatic transmission generated by the artificial intelligence processor, the information related to the assist force for assisting propulsion of the human-powered vehicle generated by the artificial intelligence processor, the information related to the height of the saddle generated by the artificial intelligence processor, the information related to the state of the suspension generated by the artificial intelligence processor, the information related to the brake generated by the artificial intelligence processor, the information related to the lamp generated by the artificial intelligence processor, and the information related to the content of presentation generated by the artificial intelligence processor.

In accordance with a sixth aspect of the present disclosure, the human-powered vehicle component according to the fourth or fifth aspect is configured so that the other human-powered vehicle component includes at least one of an electric transmission, a drive device for assisting propulsion of the human-powered vehicle, an electric adjustable seatpost, an electric suspension, an electric brake device, a lamp, and a presentation device.

In accordance with the human-powered vehicle component of the sixth aspect, at least one of the electric transmission, the drive device, the electric adjustable seatpost, the electric suspension, the electric brake device, the lamp, and the presentation device is controlled in accordance with the third information generated by the artificial intelligence processor.

In accordance with a seventh aspect of the present disclosure, the human-powered vehicle component according to any one of the fourth to sixth aspects is configured so that the mobile electronic device includes at least one of a vibration generator, a display, and a speaker.

In accordance with the human-powered vehicle component of the seventh aspect, at least one of the vibration generator, the display, and the speaker is controlled in accordance with the third information generated by the artificial intelligence processor.

In accordance with an eighth aspect of the present disclosure, the human-powered vehicle component according to any one of the fourth to seventh aspects is an electric transmission, a drive device for assisting propulsion of the human-powered vehicle, a seatpost, a suspension, a brake device, an operation device, a lamp, a presentation device, or a battery device.

In accordance with the human-powered vehicle component of the eighth aspect, the artificial intelligence processor is provided on at least one of the electric transmission, the drive device, the seatpost, the suspension, the brake device, the operation device, the lamp, the presentation device, or the battery device.

In accordance with a ninth aspect of the present disclosure, the human-powered vehicle component according to any one of the first to eighth aspects is configured so that the first information related to the human-powered vehicle includes at least one of a transmission ratio of the human-powered vehicle, a vehicle speed of the human-powered vehicle, a rotational speed of a crank of the human-powered vehicle, a state of an operation device of the human-powered vehicle, and a travel route of the human-powered vehicle.

In accordance with the human-powered vehicle component of the ninth aspect, the artificial intelligence processor configured to generate the third information in accordance with at least one of the transmission ratio of the human-powered vehicle, the vehicle speed of the human-powered vehicle, the rotational speed of the crank of the human-powered vehicle, the state of the operation device of the human-powered vehicle, and the travel route of the human-powered vehicle.

In accordance with a tenth aspect of the present disclosure, the human-powered vehicle component according to any one of the first to ninth aspects is configured so that the first information related to the rider of the human-powered vehicle includes at least one of a human driving force input to the human-powered vehicle by the rider of the human-powered vehicle, a state of the rider of the human-powered vehicle, and information related to energy consumption of the rider of the human-powered vehicle.

In accordance with the human-powered vehicle component of the tenth aspect, the artificial intelligence processor configured to generate the third information in accordance with at least one of the human driving force that input to the human-powered vehicle by the rider of the human-powered vehicle, the state of the rider of the human-powered vehicle, and the information related to the energy consumption of the rider of the human-powered vehicle.

In accordance with an eleventh aspect of the present disclosure, the human-powered vehicle component according to any one of the first to tenth aspects is configured so that the first information related to the environment of the human-powered vehicle includes at least one of weather information, map information, and traffic information.

In accordance with the human-powered vehicle component of the eleventh aspect, the artificial intelligence processor configured to generate the third information in accordance with at least one of the weather information, the map information, and the traffic information.

A mobile electronic device in accordance with a twelfth aspect of the present disclosure comprises an input device to which first information related to at least one of a human-powered vehicle, a rider of the human-powered vehicle, and environment of the human-powered vehicle is input. The mobile electronic device further comprises an artificial intelligence processor configured to generate fourth information for controlling a human-powered vehicle component provided on the human-powered vehicle in accordance with the first information input to the input device.

In accordance with the mobile electronic device of the twelfth aspect, the human-powered vehicle component is controlled in accordance with the fourth information generated by the artificial intelligence processor. This improves usability.

In accordance with a thirteenth aspect of the present disclosure, the mobile electronic device according to the twelfth aspect further comprises an output device that outputs the fourth information.

In accordance with the mobile electronic device of the thirteenth aspect, the fourth information is output in a preferred manner by the output device.

In accordance with a fourteenth aspect of the present disclosure, in the mobile electronic device according to the thirteenth aspect, the output device is configured to output the fourth information through wireless communication.

In accordance with the mobile electronic device of the fourteenth aspect, the fourth information is output through wireless communication.

In accordance with a fifteenth aspect of the present disclosure, in the mobile electronic device according to the thirteenth aspect, the output device is configured to output the fourth information through an electric cable connected to the human-powered vehicle component.

In accordance with the mobile electronic device of the fifteenth aspect, the fourth information is output by the electric cable.

In accordance with a sixteenth aspect of the present disclosure, the mobile electronic device according to any one of the twelfth to fifteenth aspects is configured so that the human-powered vehicle component includes at least one of an electric transmission, a drive device for assisting propulsion of the human-powered vehicle, an electric adjustable seatpost, an electric suspension, an electric brake device, and a lamp.

In accordance with the mobile electronic device of the sixteenth aspect, at least one of the electric transmission, the drive device, the electric adjustable seatpost, the electric suspension, the electric brake device, and the lamp is controlled in accordance with the fourth information generated by the artificial intelligence processor.

In accordance with a seventeenth aspect of the present disclosure, the mobile electronic device according to any one of the twelfth to sixteenth aspects further comprises a presentation device, and is configured so that the artificial intelligence processor configured to generate fifth information for controlling the presentation device in accordance with the first information input to the input device.

In accordance with the mobile electronic device of the seventeenth aspect, the presentation device is controlled in accordance with the fifth information generated by the artificial intelligence processor.

A mobile electronic device in accordance with an eighteenth aspect of the present disclosure comprises an input device to which first information related to at least one of a human-powered vehicle, a rider of the human-powered vehicle, and environment of the human-powered vehicle is input. The mobile electronic device further comprises a presentation device and an artificial intelligence processor configured to generate sixth information for controlling the presentation device in accordance with the first information input to the input device.

In accordance with the mobile electronic device of the eighteenth aspect, the presentation device is controlled in accordance with the sixth information generated by the artificial intelligence processor. This improves usability.

In accordance with a nineteenth aspect of the present disclosure, the mobile electronic device according to the seventeenth or eighteenth aspect is configured so that the presentation device includes at least one of a display and a speaker.

In accordance with the mobile electronic device of the nineteenth aspect, at least one of the display and the speaker is controlled in accordance with the sixth information generated by the artificial intelligence processor.

In accordance with a twentieth aspect of the present disclosure, in the mobile electronic device according to any one of the twelfth to nineteenth aspects, the input device is configured to receive the first information through wireless communication.

In accordance with the mobile electronic device of the twentieth aspect, the first information is acquired through wireless communication.

In accordance with a twenty-first aspect of the present disclosure, the mobile electronic device according to any one of the twelfth to twentieth aspects further comprises a wireless communication device configured to connect to a public communication network is further provided.

In accordance with the mobile electronic device of the twenty-first aspect, the wireless communication device allows for connection with the public communication network through.

In accordance with a twenty-second aspect of the present disclosure, the mobile electronic device according to any one of the twelfth to twenty-first aspects is configured so that the artificial intelligence processor includes storage configured to store software and a processing device is configured to execute the software stored in the storage.

In accordance with the mobile electronic device of the twenty-second aspect, the storage and the processing device allow the artificial intelligence process to be performed in a preferred manner.

Human-powered vehicle equipment in accordance with a twenty-third aspect of the present disclosure comprises a mobile electronic device according to any of the twelfth to twenty-second aspects.

In accordance with the human-powered vehicle equipment of the twenty-third aspect, the human-powered vehicle equipment is integrated with the mobile electronic device.

In accordance with a twenty-fourth aspect of the present disclosure, the human-powered vehicle equipment according to the twenty-third aspect further comprises a helmet and a shoe provided with the mobile electronic device.

In accordance with the human-powered vehicle equipment of the twenty-fourth aspect, the mobile electronic device is integrated with the helmet or the shoe.

The human-powered vehicle component, the mobile electronic device, and the human-powered vehicle equipment of the present disclosure improve usability.

EMBODIMENTS OF THE DISCLOSURE

Figure 1:
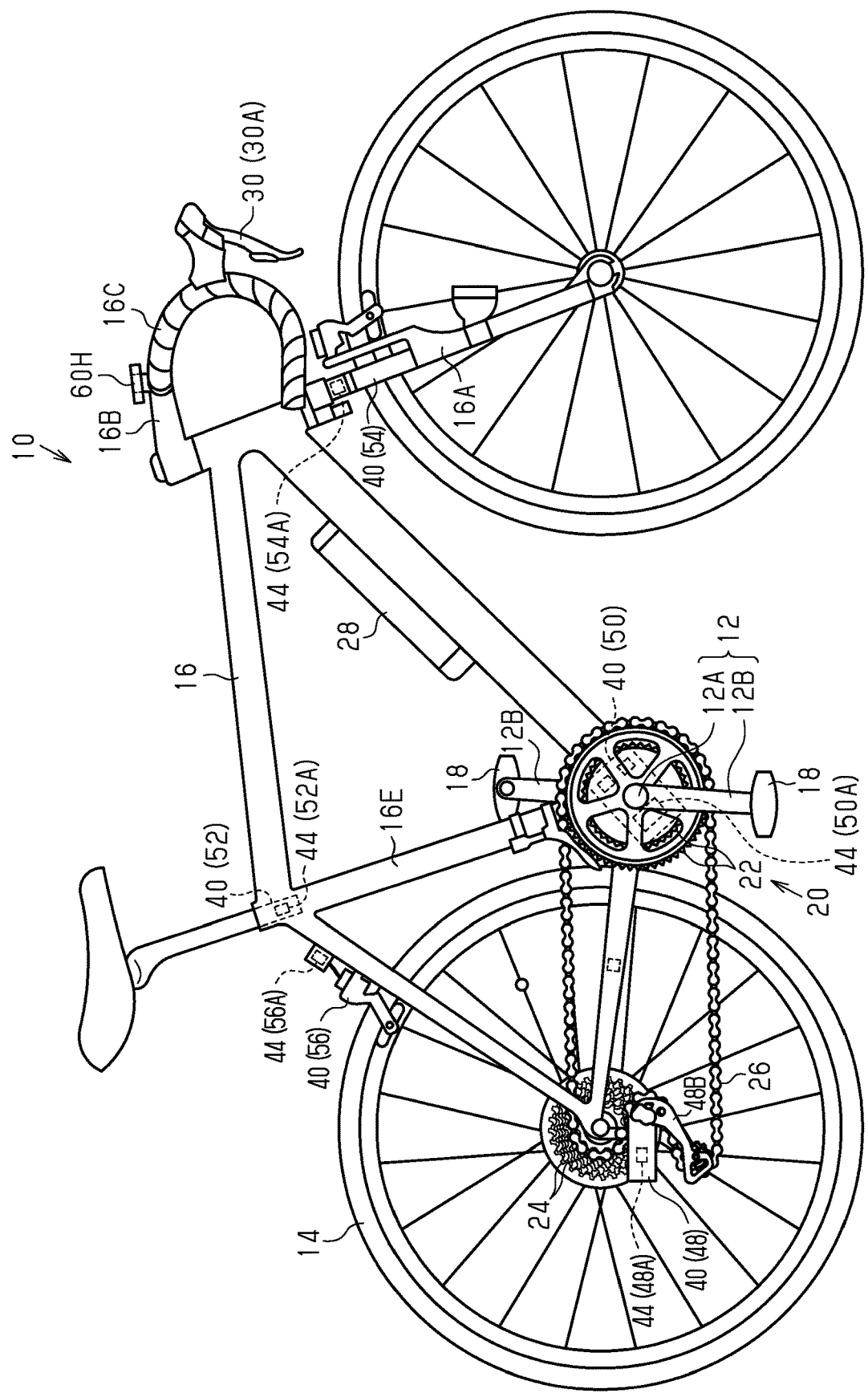
FIG. 1 is a side view of a human-powered vehicle including a human-powered vehicle component in accordance with a first embodiment.
Figure 2:
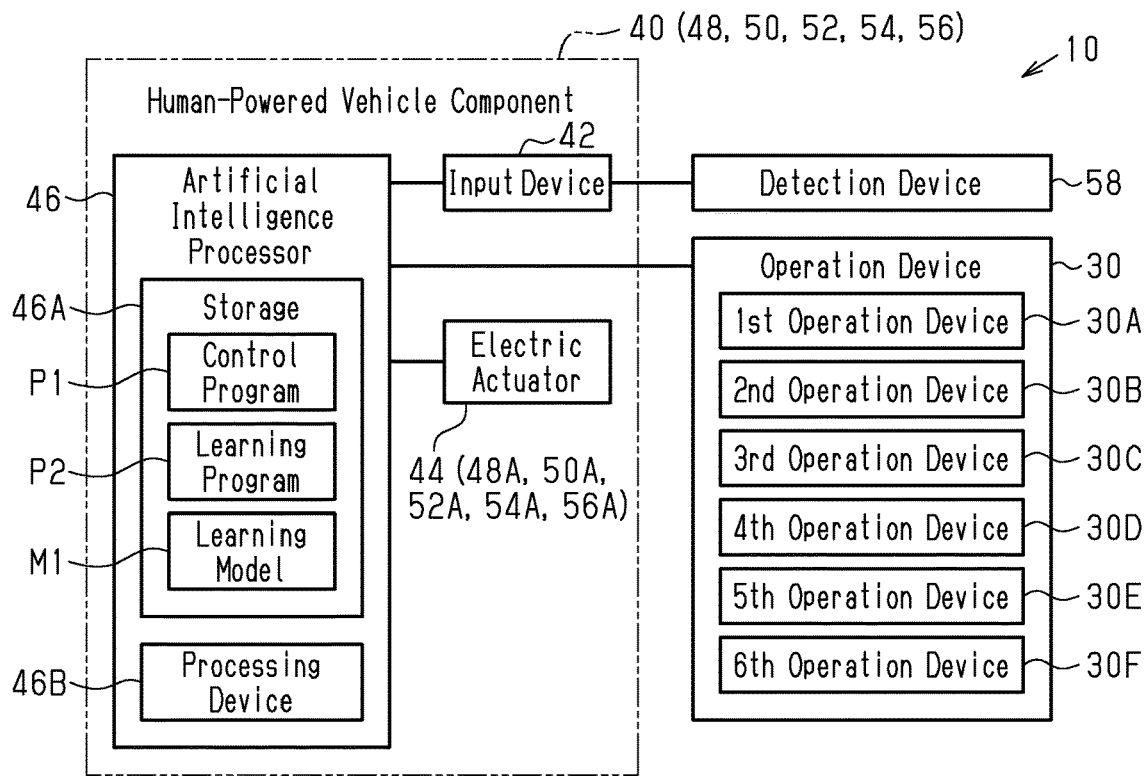
FIG. 2 is a block diagram showing an electrical configuration of the human-powered vehicle component in accordance with the first embodiment.
Figure 3:
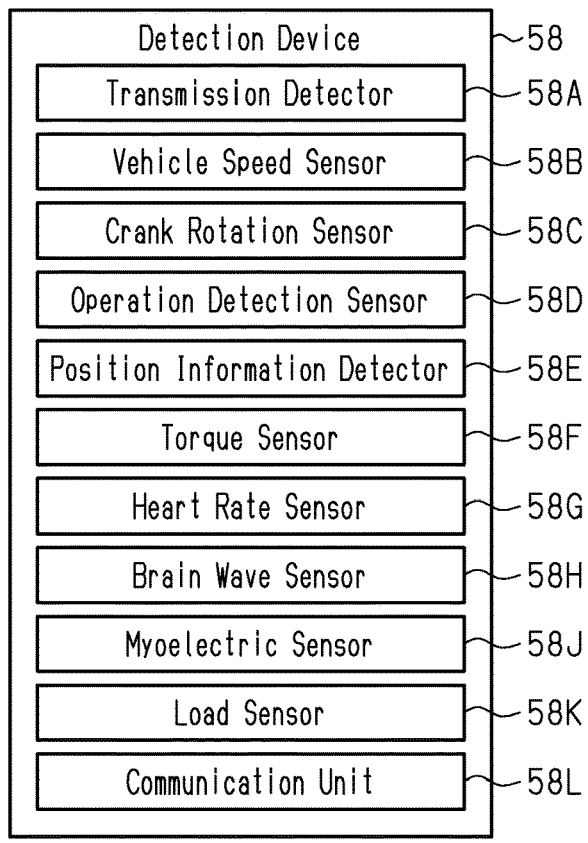
FIG. 3 is a block diagram schematically showing a detection device of FIG. 2.

The expression "at least one of" as used in the present specification means "one or more" of the desired options. As an example, the expression "at least one of" as used in the present specification means "only one option" or "both of two options" if the number of options is two. As another example, the expression "at least one of" as used in the present specification can be "only one option" or "combination of two or more arbitrary options" if the number of options is three or more. The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

First Embodiment

A human-powered vehicle component 40 in accordance with a first embodiment will now be described with reference to FIGS. 1 to 4. A human-powered vehicle 10 is a vehicle that is configured to be driven by at least human driving force. The human-powered vehicle 10 includes, for example, a bicycle. There is no limit to the number of wheels of the human-powered vehicle 10. Thus, the human-powered vehicle 10 includes a unicycle and a vehicle having, for example, three or more wheels. The human-powered vehicle includes various types of bicycles such as a mountain bike, a road bike, a city bike, a cargo bike, a recumbent bike, and an electric bicycle (e-bike). The electric bicycle includes an electric assist bicycle that assists propulsion of the vehicle with an electric motor. Hereinafter, the human-powered vehicle 10 will be described as a bicycle in the embodiment.

The human-powered vehicle 10 includes a crank 12 and a drive wheel 14. The human-powered vehicle 10 further includes a frame 16. Human driving force is input to the crank 12. The crank 12 includes a crankshaft 12A rotatable relative to the frame 16 and crank arms 12B respectively provided on the axial ends of the crankshaft 12A. A pedal 18 is connected to each crank arm 12B. The drive wheel 14 is driven by the rotation of the crank 12. The drive wheel 14 is supported by the frame 16. The crank 12 and the drive wheel 14 are connected by a drive mechanism 20. The drive mechanism 20 includes a first rotary body 22 coupled to the crankshaft 12A. The crankshaft 12A and the first rotary body 22 can be coupled by a first one-way clutch. The first one-way clutch is configured to rotate the first rotary body 22 forward in a case where the crank 12 rotates forward and not rotate the first rotary body 22 backward in a case where the crank 12 rotates backward. The first rotary body 22 includes a sprocket, a pulley, or a bevel gear. The drive mechanism 20 further includes a second rotary body 24 and a linking member 26. The linking member 26 transmits the rotational force of the first rotary body 22 to the second rotary body 24. The linking member 26 includes, for example, a chain, a belt, or a shaft.

The second rotary body 24 is connected to the drive wheel 14. The second rotary body 24 includes a sprocket, a pulley, or a bevel gear. Preferably, a second one-way clutch is provided between the second rotary body 24 and the drive wheel 14. The second one-way clutch is configured to rotate the drive wheel 14 forward in a case where the second rotary body 24 rotates forward and not rotate the drive wheel 14 backward in a case where the second rotary body 24 rotates backward.

The human-powered vehicle 10 includes a front wheel and a rear wheel. The front wheel is attached to the frame 16 by a front fork 16A. A handlebar 16C is connected to the front fork 16A by a stem 16B. In the embodiments described hereafter, the rear wheel will be described as the drive wheel 14. However, the front wheel can be the drive wheel 14.

The human-powered vehicle 10 further includes a battery device 28. The battery device 28 includes one or more battery cells. The battery cell includes a rechargeable battery. The battery device 28 is provided on the human-powered vehicle 10 and supplies power to another electrical component, such as the human-powered vehicle component 40 that is electrically connected to the battery device 28 by a wire. The battery device 28 is connected to the human-powered vehicle component 40 to communicate with the human-powered vehicle component 40 through wired or wireless connection. The battery device 28 is configured to communicate with the human-powered vehicle component 40 through, for example, power line communication (PLC). The battery device 28 can be attached to the outside of the frame 16 or can be at least partially accommodated in the frame 16. The battery device 28 can be provided on the human-powered vehicle component 40.

The human-powered vehicle 10 further includes an operation device 30. The operation device 30 is connected to the human-powered vehicle component 40 to communicate with the human-powered vehicle component 40 through wired or wireless connection. The operation device 30 is configured to communicate with the human-powered vehicle component 40 through, for example, power line communication (PLC). The operation device 30 can be connected to an artificial intelligence processor 46 of the human-powered vehicle component 40 to communicate with the artificial intelligence processor 46. The operation device 30 can be connected to a processing device that differs from the artificial intelligence processor 46 of the human-powered vehicle component 40. The operation device 30 can be connected to a processing device of the human-powered vehicle component 40 that is subject to operation.

The operation device 30 includes, for example, an operation member, a first detector that detects movement of the operation member, and a first electric circuit that communicates with the human-powered vehicle component 40 in accordance with an output signal of the first detector. As the user operates the operation member, the first electric circuit transmits a signal corresponding to the output signal of the first detector to the human-powered vehicle component 40. The operation member and the first detector that detects movement of the operation member are configured by a push switch, a lever type switch, or a touch panel. The operation device 30 is provided, for example, on a handlebar 16C. In a case where the operation device 30 is connected to the human-powered vehicle component 40 to communicate with the human-powered vehicle component 40 through wireless connection, the operation device 30 includes a wireless communication device. The operation device 30 includes at least one of a first operation device 30A for operating an electric transmission 48, a second operation device 30B for changing an operation state of a drive device 50 assisting propulsion of the human-powered vehicle 10, a third operation device 30C for changing an operation state of an electric adjustable seatpost 52, a fourth operation device 30D for changing an operation state of an electric suspension 54, a fifth operation device 30E for changing an operation state of an electric brake device 56, and a sixth operation device 30F for changing an operation state of a presentation device 60H. The first operation device 30A includes, for example, an operating unit for changing a transmission ratio. The second operation device 30B includes, for example, an operating unit for changing an operation mode of the drive device 50. The third operation device 30C includes, for example, an operating unit for changing the height of the electric adjustable seatpost 52. The fourth operation device 30D includes, for example, an operating unit for changing the hardness of the electric suspension 54. The fifth operation device 30E includes, for example, an operating unit for changing the magnitude of the braking force. The sixth operation device 30F includes, for example, an operating unit for changing display content displayed on a display unit of the presentation device 60H.

The presentation device 60H is provided, for example, on a handlebar. The presentation device 60H includes at least one of a display unit and a speaker. The presentation device 60H is configured by, for example, a cycle computer.

The human-powered vehicle component 40 includes an input device 42, an electric actuator 44, and the artificial intelligence processor 46. First information related to at least one of the human-powered vehicle 10, the rider of the human-powered vehicle 10, and the environment of the human-powered vehicle 10 is input to the input device 42. The artificial intelligence processor 46 is configured to generate second information for controlling the electric actuator 44 in accordance with the first information input to the input device 42.

The artificial intelligence processor 46 includes storage 46A configured to store software and a processing device 46B configured to executes software stored in the storage 46A. The processing device 46B includes, for example, a central processing unit (CPU) or a micro-processing unit (MPU). Preferably, the processing device 46B includes a graphics processing unit (GPU) in addition to the CPU or the MPU. The processing device 46B can include a field-programmable gate array (FPGA). The artificial intelligence processor 46 can include one or more processing devices. The artificial intelligence processor 46 can include a plurality of processing devices 46B located at separate positions. The processing device 46B executes control programs stored in the storage 46A.

The storage 46A includes, for example, a nonvolatile memory and a volatile memory. The storage 46A stores control program P1 and learning model M1. In the present embodiment, learning model M1 is a learned model learned through a predetermined learning algorithm. The learning algorithm includes machine learning, deep learning or deep reinforcement learning. The learning algorithm includes, for example, at least one of supervised learning, unsupervised learning, and reinforcement learning. As a learning algorithm, methods other than the method described in the present specification can be used as long as learning model M1 can be updated using a method belonging to the field of artificial intelligence. The GPU executes the learning process for updating learning model M1. The learning algorithm can use a neural network (NN). The learning algorithm can use a recurrent neural network.

The artificial intelligence processor 46 is configured to output the second information by processing the first information acquired by the detection device 58 using learning model M1 based on control program P1.

The second information includes at least one of information related to an automatic transmission, information related to an assist force for assisting propulsion of the human-powered vehicle 10, information related to a height of a saddle, information related to a state of the suspension, and information related to a brake. The information related to the assist force for assisting propulsion of the human-powered vehicle includes information related to a ratio of the assist force relative to the human driving force.

The human-powered vehicle component 40 includes at least one of the electric transmission 48, the drive device 50 that assists propulsion of the human-powered vehicle 10, the electric adjustable seatpost 52, the electric suspension 54, and the electric brake device 56.

In a case where the second information includes information related to an automatic transmission, the electric actuator 44 includes an electric actuator 48A included in the electric transmission 48. In a case where the second information includes information related to an assist force, the electric actuator 44 includes an electric actuator 50A included in the drive device 50. In a case where the second information includes information related to a brake, the electric actuator 44 includes an electric actuator 54A included in the electric brake device 56.

In a case where the human-powered vehicle component 40 includes the electric transmission 48, the electric actuator 44 includes the electric actuator 48A for operating the electric transmission 48. The electric transmission 48 is configured to change, in steps, a ratio of a rotational speed of the drive wheel 14 relative to a rotational speed of a rotary body to which the human driving force is input. The rotary body to which the human driving force is input includes the crank 12. The electric transmission 48 includes the electric actuator 48A and a transmission main body 48B driven by the electric actuator 48A. The artificial intelligence processor 46 is configured to control the electric actuator 48A. The electric actuator 48A includes an electric motor and a drive circuit that controls the electric power supplied to the electric motor. The electric transmission 48 is used to change the ratio of the rotational speed of the drive wheel relative to the rotational speed of the crank 12. In the present embodiment, the electric transmission 48 is configured to change the ratio in steps. The electric actuator 48A has the transmission main body 48B perform a shift operation. The drive circuit included in the electric actuator 48A is connected to the artificial intelligence processor 46 to communicate with the artificial intelligence processor 46 through wired or wireless connection. The electric actuator 48A is configured to communicate with the artificial intelligence processor 46 through, for example, power line communication (PLC). The electric actuator 48A has the transmission main body 48B perform a shift operation in accordance with a control signal from the artificial intelligence processor 46. The electric transmission 48 includes at least one of an internal transmission device and an external transmission device. The derailleur includes at least one of a front derailleur and a rear derailleur.

In a case where the human-powered vehicle component 40 includes the drive device 50, the drive device 50 includes an electric actuator 50A that assists propulsion of the human-powered vehicle 10. The electric actuator 50A includes an electric motor and a drive circuit that controls the electric power supplied to the electric motor. Preferably, the electric motor included in the electric actuator 50A and the drive circuit included in the electric actuator 50A are provided on the same housing. The drive circuit controls the electric power supplied from the battery device 28 to the motor. The drive circuit included in the electric actuator 50A is connected to the artificial intelligence processor 46 to communicate with the artificial intelligence processor 46 through wired or wireless connection. The electric actuator 50A is configured to communicate with the artificial intelligence processor 46 through, for example, serial communication. The drive circuit included in the electric actuator 50A drives the electric motor in accordance with a control signal from the artificial intelligence processor 46. The electric motor is provided in a power transmission path of the human driving force from the pedal 18 to the rear wheel or provided to transmit rotation to the front wheel. The electric motor is provided on the frame 16, the rear wheel, or the front wheel of the human-powered vehicle 10. In one example, the motor is coupled to a power transmission path from the crankshaft 12A to the first rotary body 22. Preferably, a one-way clutch is provided in the power transmission path between the electric motor and the crankshaft 12A so that the electric motor is not rotated by the rotational force of the crank 12 in a case where the crankshaft 12A is rotated in the direction in which the human-powered vehicle 10 moves forward. The housing on which the electric motor and the drive circuit are provided can include components other than the electric motor, and for example, can be provided with a reduction gear that decelerates and outputs the rotation of the electric motor.

In a case where the human-powered vehicle component 40 includes the electric adjustable seatpost 52, the electric adjustable seatpost 52 includes an electric actuator 52A. The electric actuator 52A includes, for example, an electric motor and a drive circuit that controls the electric power supplied to the electric motor. The electric motor included in the electric actuator 52A can be replaced by a solenoid. The electric adjustable seatpost 52 is provided on the seat tube 16E and is configured to change the height of the saddle. The electric adjustable seatpost 52 includes an electric seatpost, in which the seatpost is extended or retracted by the force of the electric actuator 52A, or a mechanical seatpost, in which the seatpost is extended with at least one of the force of a spring and pneumatic force controlled with a valve by the electric actuator 52A and retracted using manual force. The mechanical seatpost includes a hydraulic seatpost or a hydraulic-pneumatic seatpost.

In a case where the human-powered vehicle component 40 includes the electric suspension 54, the electric suspension 54 includes the electric actuator 54A for operating the electric suspension 54. The electric actuator 54A includes, for example, the electric motor and the drive circuit that controls the electric power supplied to the electric motor. The electric motor included in the electric actuator 54A can be replaced by a solenoid. The electric suspension 54 includes at least one of a rear suspension and a front suspension. The electric suspension 54 absorbs an impact applied to the wheel. The electric suspension 54 can be a hydraulic suspension or an air suspension. The electric suspension 54 includes a first portion and a second portion, which is fitted to the first portion and movable relative to the first portion. The operational state of the electric suspension 54 includes a locked state, in which relative movement between the first portion and the second portion is restricted, and an unlocked state, in which relative movement between the first portion and the second portion is permitted. The electric actuator 54A switches the operational state of the electric suspension 54. The locked state of the electric suspension 54 can include a state where the first portion and the second portion slightly move relative to each other in a case where a strong force is applied to the wheel. Instead of or in addition to the locked state and the unlocked state, the operational state of the electric suspension 54 can include at least one of a plurality of operational states with different damping forces and a plurality of operational states with different stroke amounts.

The rear suspension is configured to be provided on the frame 16 of the human-powered vehicle 10. More specifically, the rear suspension is provided between a frame body of the frame 16 and a swing arm that supports the rear wheel. The rear suspension absorbs an impact applied to the rear wheel. The front suspension is configured to be provided between the frame 16 of the human-powered vehicle 10 and the front wheel. More specifically, the front suspension is provided on the front fork 16A. The front suspension absorbs an impact applied to the front wheel.

In a case where the human-powered vehicle component 40 includes the electric brake device 56, the electric brake device 56 includes the electric actuator 56A. The electric brake device 56 is configured to brake at least one of the front wheel and the rear wheel. The electric brake device 56 includes a brake device main body including at least one of a disk brake, a rim brake, a drum brake, and a roller brake. The electric actuator 56A drives the brake device main body. The electric actuator 56A includes, for example, the electric motor and the drive circuit that controls the electric power supplied to the electric motor. The electric brake device 56 can include an electric motor for performing regenerative braking. The electric motor for executing the regenerative braking can be the electric motor of the electric actuator 50A in the drive device 50.

Preferably, the input device 42 is configured to receive output information from the detection device 58. In a case where the input device 42 and the detection device 58 are electrically connected, the input device 42 includes, for example, an electrical connector. The input device 42 can include an electric cable instead of the electrical connector. In a case where the input device 42 and the detection device 58 perform wirelessly communication with each other, the input device 42 includes a wireless communication device. The wireless communication device is configured to communicate, for example, through radio waves or infrared rays.

The first information related to the human-powered vehicle 10 includes at least one of the transmission ratio of the human-powered vehicle 10, the vehicle speed of the human-powered vehicle 10, the rotational speed of the crank of the human-powered vehicle 10, the state of the operation device 30 of the human-powered vehicle 10, and the travel route of the human-powered vehicle.

The transmission ratio is a ratio of the rotational speed of the drive wheel 14 relative to the rotational speed of the rotary body to which the human driving force changed by the electric transmission 48 is input. In a case where the first information includes the transmission ratio, the detection device 58 includes a transmission detector 58A that detects information related to shifting of the transmission ratio. The transmission detector 58A is configured to detect the operational state of the electric transmission 48, the information related to the ratio of the electric transmission 48, the control signal transmitted from a controller that controls the electric transmission 48, and the operation signal of the operating unit for operating the electric transmission 48. The detection device 58 can be included in the human-powered vehicle component 40. The detection device 58 can be configured to include the processing device 46B. The detection device 58 can be supplied with electric power from the battery device 28 or can be provided with a battery that differs from the battery device 28.

Preferably, in a case where the first information includes the vehicle speed, the detection device 58 includes a vehicle speed sensor 58B. The vehicle speed sensor 58B detects information related to the rotational speed of the wheel of the human-powered vehicle 10. The vehicle speed sensor 58B outputs a signal corresponding to the rotational speed of the wheel. The vehicle speed of the human-powered vehicle 10 can be calculated based on the rotational speed of the wheel. Preferably, the vehicle speed sensor 58B includes a magnetic reed, which forms a reed switch, or a Hall element. The vehicle speed sensor 58B can be mounted on a chain stay of the frame 16 of the human-powered vehicle 10 to detect a magnet attached to the rear wheel or can be provided on the front fork 16A to detect a magnet attached to the front wheel.

Preferably, in a case where the first information includes the rotational speed of the crank 12, the detection device 58 includes a crank rotation sensor 58C. The crank rotation sensor 58C is used to detect a rotational speed of the crank 12. The crank rotation sensor 58C is attached to the frame 16 of the human-powered vehicle 10 or the housing of the drive device 50. The crank rotation sensor 58C is configured to include a magnetic sensor that outputs a signal corresponding to the intensity of the magnetic field. An annular magnet of which magnetic field intensity changes in the circumferential direction is provided on the crankshaft 12A, on a member that rotates in cooperation with the crankshaft 12A, or in a power transmission path between the crankshaft 12A and the first rotary body 22. The crank rotation sensor 58C outputs a signal corresponding to the rotational speed of the crank 12. The magnet can be provided on a member that rotates integrally with the crankshaft 12A in the power transmission path of the human driving force from the crankshaft 12A to the first rotary body 22. For example, the magnet can be provided on the first rotary body 22 in a case where the first one-way clutch is not provided between the crankshaft 12A and the first rotary body 22. The crank rotation sensor can include an optical sensor, an acceleration sensor, or a torque sensor instead of the magnetic sensor.

Preferably, in a case where the first information includes the state of the operation device 30, the detection device 58 includes an operation detection sensor 58D provided on the operation device 30. The operation detection sensor 58D can be configured by the first detector of the operation device 30.

Preferably, in a case where the first information includes the travel route of the human-powered vehicle 10, the detection device 58 includes a position information detector 58E. Preferably, the position information detector 58E includes a global positioning system (GPS) receiver and a storage unit that stores map information. The map information can be acquired from an external device electrically connected to the detection device 58. The storage unit of the position information detector 58E includes, for example, a nonvolatile memory.

The first information related to the rider of the human-powered vehicle 10 includes at least one of the human driving force that the rider of the human-powered vehicle 10 inputs to the human-powered vehicle 10, the state of the rider of the human-powered vehicle 10, and the information related to energy consumption of the rider of the human-powered vehicle 10.

Preferably, in a case where the first information includes the human driving force, the detection device 58 includes a torque sensor 58F. The torque sensor 58F is used to detect the torque of the human driving force input to the crank 12. For example, in a case where the first one-way clutch is provided in the power transmission path, the torque sensor 58F is provided on the upstream side of the first one-way clutch. The torque sensor 58F includes a strain sensor, a magnetostrictive sensor, or a pressure sensor. The strain sensor includes, for example, a strain gauge. The torque sensor 58F is provided on a member included in the power transmission path or in the vicinity of the member included in the power transmission path. The member included in the power transmission path is, for example, a crankshaft 12A, a crank arm 12B, or a pedal 18. The torque sensor 58F can include a wireless communication device or wired communication unit. The human driving force can include the power of the human driving force. Preferably, in this case, the detection device 58 includes the torque sensor 58F and the crank rotation sensor 58C.

The state of the rider includes at least one of the physical condition of the rider and the posture of the rider. Preferably, in a case where the first information includes the physical condition of the rider, the detection device 58 includes at least one of a heart rate sensor 58G, a brain wave sensor 58H, and a myoelectric sensor 58J. In a case where the first information includes the posture of the rider, the detection device includes a load sensor 58K. The load sensor 58K outputs a signal corresponding to the posture of the rider. The load sensor 58K is provided, for example, on at least one of a saddle and a seatpost. The output of the load sensor 58K greatly changes between a case where the rider is standing pedaling and a case where the rider is seated pedaling. The output of the load sensor 58K is such that the load applied by the rider to the saddle and the seatpost changes in accordance with the posture of the rider. This allows the posture of the rider to be detected from the output of the load sensor 58K. Instead of the load sensor 58K, a camera can be used to detect the posture of the rider.

Preferably, in a case where the first information includes the energy consumption of the rider, the detection device 58 includes the torque sensor 58F and the crank rotation sensor 58C. The detection device 58 includes a processing device and calculates the power of the human driving force by multiplying the human driving force detected by the torque sensor 58F and the crank rotational speed detected by the crank rotation sensor 58C. This allows for detection of the power of the human driving force as the energy consumption. In a case where the detection device 58 does not include the processing device, the power of the human driving force is calculated by multiplying the human driving force detected by the torque sensor 58F and the crank rotational speed detected by the crank rotation sensor 58C with the artificial intelligence processor 46, and the power of the human driving force can be detected as the energy consumption.

The first information related to the environment of the human-powered vehicle 10 includes at least one of weather information, map information, and traffic information. Preferably, in a case where the first information includes at least one of weather information, map information, and traffic information, the detection device 58 includes a communication unit 58L configured to receive information from at least one of a public communication network, a broadcast station, and a traffic road information system. The communication unit 58L is configured to acquire at least one of weather information, map information, and traffic information provided in at least one of a public communication network, a broadcast station, and a traffic road information system.

Figure 4:
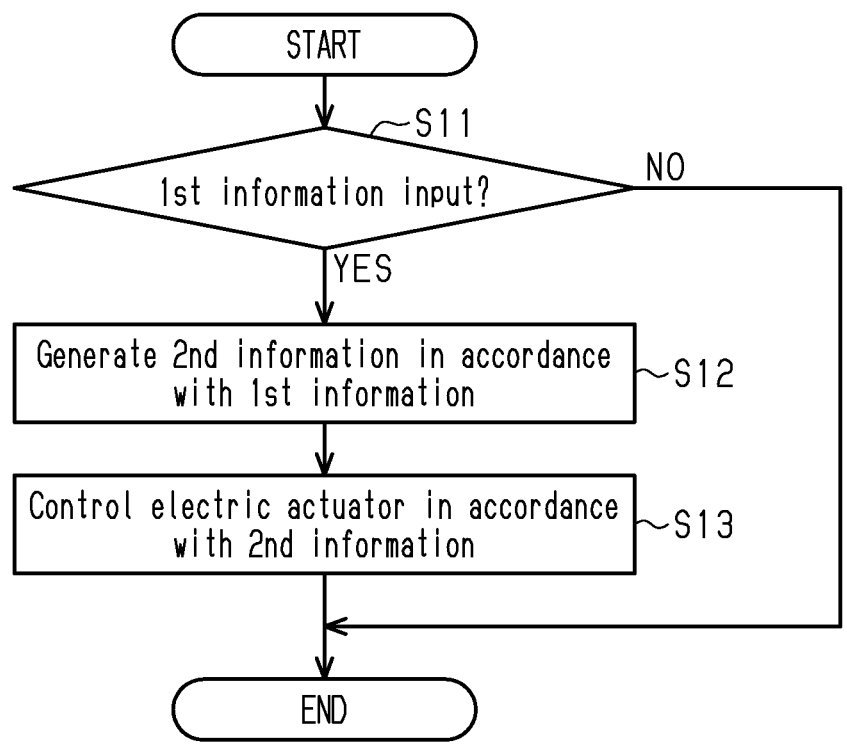
FIG. 4 is a flowchart of a process for generating second information in accordance with first information executed by an artificial intelligence processor of FIG. 2.

A process for controlling the electric actuator 44 in accordance with the first information will now be described with reference to FIG. 4. If the artificial intelligence processor 46 is supplied with electric power, the artificial intelligence processor 46 starts the process based on control program P1 and proceeds to step S11 of the flowchart shown in FIG. 4.

In step S11, the artificial intelligence processor 46 determines whether or not the first information has been input. Specifically, in a case where the first information has been input to the input device 42, the artificial intelligence processor 46 determines that the first information has been input. In a case where the first information has not been input, the artificial intelligence processor 46 ends the process. The artificial intelligence processor 46 proceeds to step S11 after a predetermined cycle elapses from the end of the flowchart shown in FIG. 4 until the supply of electric power is stopped. In a case where the first information has been input, the artificial intelligence processor 46 proceeds to step S12.

In step S12, the artificial intelligence processor 46 generates the second information in accordance with the first information and then proceeds to step S13. In step S13, the artificial intelligence processor 46 controls the electric actuator 44 in accordance with the second information and then ends the process.

The storage 46A can include learning program P2. The artificial intelligence processor 46 updates learning model M1 for generating the second information using the first information with a learning algorithm based on learning program P2. In this case, the artificial intelligence processor 46 operates in the learning mode and the control mode. In a case where the artificial intelligence processor 46 operates in the learning mode, the artificial intelligence processor 46 functions as a generation unit that generates learning model M1 with the learning algorithm based on learning program P2. In a case where the artificial intelligence processor 46 operates in the control mode, the artificial intelligence processor 46 functions as a controller that outputs the second information by processing the first information acquired by the detection device 58 using learning model M1 based on control program P1.

The artificial intelligence processor 46 updates learning model M1 for generating the second information in accordance with, for example, the first information and the operation of the operation device 30 for operating the human-powered vehicle component 40. The artificial intelligence processor 46 can control the human-powered vehicle component 40 in accordance with the preference of the rider by learning a combination of the operation of the operation device 30 and the first information in a case where the operation of the operation device 30 is performed.

Second Embodiment

Figure 5:
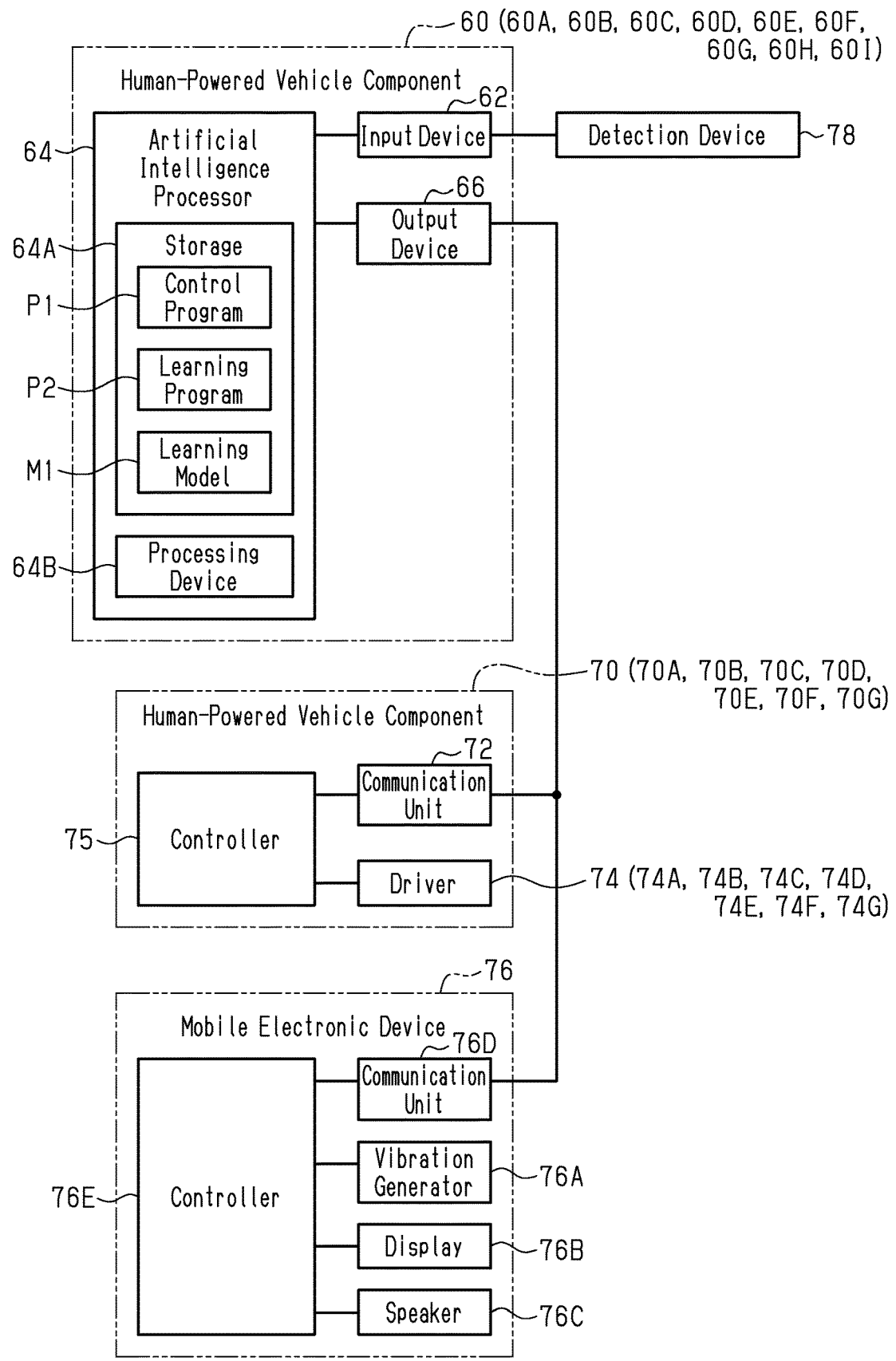
FIG. 5 is a block diagram showing an electrical configuration of a human-powered vehicle component and a mobile electronic device in accordance with a second embodiment.
Figure 6:
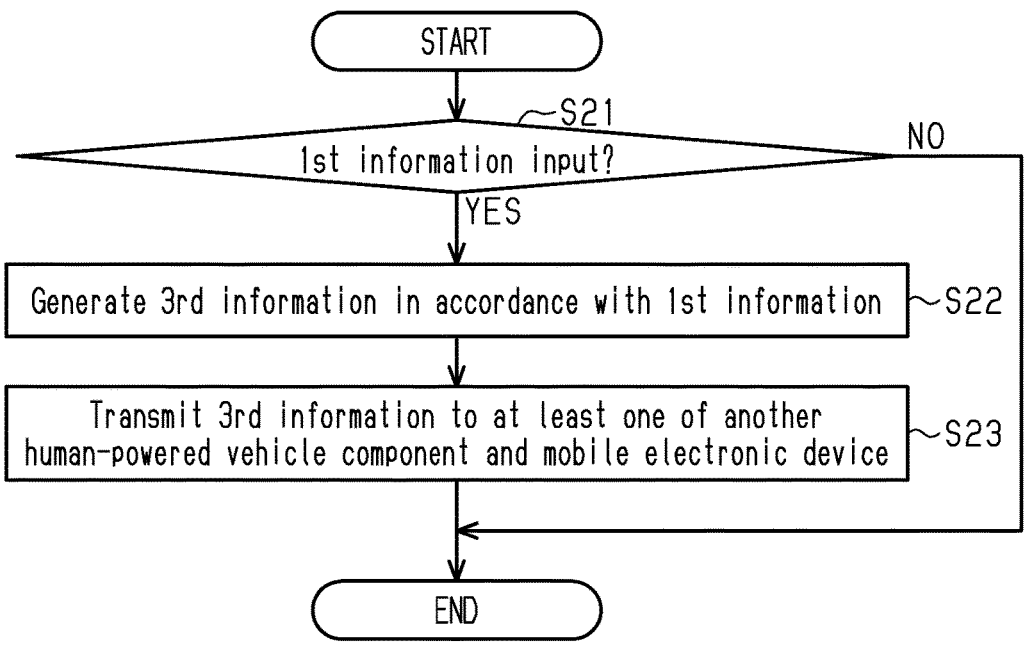
FIG. 6 is a flowchart of a process for generating third information in accordance with first information executed by an artificial intelligence processor of FIG. 5.

A human-powered vehicle component 60 in accordance with a second embodiment will now be described with reference to FIGS. 5 and 6. The human-powered vehicle component 60 in accordance with the second embodiment is applied to a human-powered vehicle 10 having the same configuration as the human-powered vehicle 10 in accordance with the first embodiment. In the present embodiment, same reference numerals are given to those components that are the same as the corresponding components of the first embodiment. Such components will not be described in detail.

The human-powered vehicle component 60 includes an input device 62 and an artificial intelligence processor 64. First information related to at least one of the human-powered vehicle 10, the rider of the human-powered vehicle 10, and the environment of the human-powered vehicle 10 is input to the input device 62. The artificial intelligence processor 64 generates the third information for controlling at least one of another human-powered vehicle component 70 provided on the human-powered vehicle 10 and a mobile electronic device 76 carried by a rider of the human-powered vehicle in accordance with the first information input to the input device 62.

The artificial intelligence processor 64 includes storage 64A storing software, and a processing device 64B that executes software stored in the storage 64A. The processing device 64B includes, for example, a CPU or an MPU. Preferably, the processing device 64B includes a GPU in addition to the CPU or the MPU. The processing device 64B can include an FPGA. The artificial intelligence processor 64 can include one or more processing devices. The artificial intelligence processor 64 can include a plurality of processing devices 64B located at separate positions.

The storage 64A includes, for example, a nonvolatile memory and a volatile memory. The storage 64A stores control program P1 and learning model M1. In the present embodiment, learning model M1 is a learned model learned by a predetermined learning algorithm. The learning algorithm includes machine learning, deep learning or deep reinforcement learning. The learning algorithm includes, for example, at least one of supervised learning, unsupervised learning, and reinforcement learning. As a learning algorithm, methods other than the method described in the present specification can be used as long as learning model M1 can be updated using a method belonging to the field of artificial intelligence. Preferably, the learning process for updating learning model M1 is performed by the GPU. The learning algorithm uses a neural network. The learning algorithm can use a recurrent neural network. The artificial intelligence processor 64 outputs the third information by processing the first information acquired by the detection device 58 using learning model M1 based on control program P1.

Preferably, the human-powered vehicle component 60 further includes an output device 66. The output device 66 outputs a control signal corresponding to the third information to at least one of the human-powered vehicle component 70 and the mobile electronic device 76. The output device 66 is configured to communicate with at least one of the human-powered vehicle component 70 and the mobile electronic device 76. The output device 66 can include a wired communication unit or a wireless communication device. In a case where the output device 66 includes a wired communication unit, the output device 66 includes, for example, an electrical connector. The output device 66 can include an electric cable instead of the electrical connector. In a case where the output device 66 includes a wireless communication device, for example, the wireless communication device is configured to communicate through radio waves or infrared rays. The wireless communication devices included in the input device 62 and the output device 66 perform communication with each other through a short-range wireless technology standard such as, for example, at least one of ANT+ and BLUETOOTH.

The human-powered vehicle component 60 includes an electric transmission 60A, a drive device 60B for assisting propulsion of the human-powered vehicle 10, a seatpost 60C, a suspension 60D, a brake device 60E, an operation device 60F, a lamp 60G, a presentation device 60H, or a battery device 60I.

The electric transmission 60A has the same configuration as the electric transmission 48 in accordance with the first embodiment. The drive device 60B has the same configuration as the drive device 50 in accordance with the first embodiment. The seatpost 60C can have the same configuration as the electric adjustable seatpost 52 in accordance with the first embodiment or can be a seatpost that does not include the electric actuator 52A. The suspension 60D can have the same configuration as the electric suspension 54 in accordance with the first embodiment or can be a suspension that does not include the electric actuator 54A. The brake device 60E can have the same configuration as the electric brake device 56 in accordance with the first embodiment or can be a brake device that does not include the electric actuator 56A.

The operation device 60F is connected to the human-powered vehicle component 70 to communicate with the human-powered vehicle component 70 through wired or wireless connection. The operation device 60F is configured to communicate with the human-powered vehicle component 70 through, for example, power line communication (PLC). The operation device 60F includes, for example, an operation member, a second detector that detects the movement of the operation member, and a second electric circuit that communicates with at least one of the human-powered vehicle component 60 and the human-powered vehicle component 70 in accordance with an output signal of the second detector. The second electric circuit transmits a signal corresponding to the output signal of the second detector to the human-powered vehicle component 70 by the user operating the operation member. The operation member and the second detector that detects movement of the operation member is configured by a push switch, a lever type switch, or a touch panel. The operation device 60F is provided, for example, on the handlebar 16C.

The lamp 60G includes at least one of a front lamp and a tail lamp. The front lamp is attached to, for example, the front fork 16A or the handlebar 16C. The tail lamp is attached to, for example, a seat stay or a seatpost. The lamp 60G includes a light emitting element.

The battery device 60I includes one or more battery cells. The battery cell includes a rechargeable battery. The battery device 60I is provided on the human-powered vehicle 10 and supplies electric power to another human-powered vehicle component 70 electrically connected to the battery device 60I. The battery device 60I can be attached to the outside of the frame 16 or at least partially accommodated in the frame 16.

The third information includes at least one of information related to an automatic transmission, information related to an assist force for assisting propulsion of the human-powered vehicle 10, information related to the height of a saddle, information related to a state of the suspension, information related to a brake, information related to a lamp, and information related to a content of a presentation that is presented to the rider of the human-powered vehicle 10.

The other human-powered vehicle component 70 includes at least one of an electric transmission 70A, a drive device 70B that assists propulsion of the human-powered vehicle 10, an electric adjustable seatpost 70C, an electric suspension 70D, an electric brake device 70E, a lamp 70F, and a presentation device 70G.

Preferably, the human-powered vehicle component 70 includes a communication unit 72 and a driver 74. The communication unit 72 is connected to the output device 66 of the human-powered vehicle component 60 to communicate with the output device 66. The communication unit 72 and the output device 66 can be connected to communicate through an electric cable or through wireless communication. The communication unit 72 receives a control signal from the artificial intelligence processor 64 and outputs the control signal to the controller 75. The electric transmission 70A, the drive device 70B that assists propulsion of the human-powered vehicle 10, the electric adjustable seatpost 70C, the electric suspension 70D, the electric brake device 70E, the lamp 70F, and the presentation device 70G each include the communication unit 72, the driver 74, and the controller 75. The controller 75 includes a processing device that executes a predetermined control program. The processing device includes, for example, a CPU or an MPU. The controller 75 can include one or more microcomputers. The controller 75 can include a storage unit. The storage unit includes, for example, a nonvolatile memory and a volatile memory. The controller 75 controls the driver 74. The controller 75 controls the driver 74 in accordance with a control signal from the artificial intelligence processor 64 received by the communication unit 72.

Preferably, in a case where the third information includes information related to an automatic transmission, the human-powered vehicle component 70 includes the electric transmission 70A. Preferably, in a case where the third information includes information related to assist force, the human-powered vehicle component 70 includes the drive device 70B. Preferably, in a case where the third information includes information related to a brake, the human-powered vehicle component 70 includes the electric brake device 70E. Preferably, in a case where the third information includes information related to a lamp, the human-powered vehicle component 70 includes the lamp 70F. Preferably, in a case where the third information includes information related to a content of a presentation, the human-powered vehicle component 70 includes the presentation device 70G.

In the present embodiment, the electric transmission 70A is configured to change, in steps, a ratio of a rotational speed of the drive wheel 14 relative to a rotational speed of a rotary body to which the human driving force is input. The rotary body to which the human driving force is input includes the crank 12. The electric transmission 70A includes a driver 74A and a transmission main body driven by driver 74A. The driver 74A includes an electric motor and a drive circuit that controls the electric power supplied to the electric motor. The electric transmission 70A is used to change the ratio of the rotational speed of the drive wheel 14 relative to the rotational speed of the crank 12. In the present embodiment, the electric transmission 70A is configured to change the ratio in steps. The driver 74A causes the transmission main body to execute a shift operation. The controller 75 controls the driver 74A in accordance with a control signal from the artificial intelligence processor 64 so that the electric transmission 70A performs a shift operation. The electric transmission 70A includes at least one of an internal transmission device and an external transmission device (derailleur).

The drive device 70B includes a driver 74B that assists propulsion of the human-powered vehicle 10. The driver 74B includes an electric motor and a drive circuit that controls the electric power supplied to the electric motor. Preferably, the electric motor included in the driver 74B and the drive circuit included in the driver 74B are provided on the same housing. The drive circuit included in the driver 74B controls the electric power supplied from the battery device 28 to the electric motor. The driver 74B is configured to communicate with the controller 75 through, for example, serial communication. The controller 75 controls the driver 74B in accordance with a control signal from the artificial intelligence processor 64 to change the assist force for assisting propulsion of the human-powered vehicle. The electric motor included in the driver 74B is provided in a power transmission path of the human driving force from the pedal 18 to the rear wheel or provided to transmit the rotation to the front wheel. The electric motor is provided on the frame 16, the rear wheel, or the front wheel of the human-powered vehicle 10. In one example, the electric motor is coupled to a power transmission path from the crankshaft 12A to the first rotary body 22. Preferably, a one-way clutch is provided in the power transmission path between the electric motor and the crankshaft 12A so that the electric motor is not rotated by the rotational force of the crank 12 in a case where the crankshaft 12A is rotated in the direction in which the human-powered vehicle 10 moves forward. The housing on which the electric motor and the drive circuit are provided can include components other than the electric motor, and for example, can be provided with a reduction gear that decelerates and outputs the rotation of the electric motor.

The electric adjustable seatpost 70C is provided on the seat tube 16E and is configured to change the height of the saddle. The electric adjustable seatpost 70C includes a driver 74C. The driver 74C includes, for example, an electric motor and a drive circuit that controls the electric power supplied to the electric motor. The electric motor included in the driver 74C can be replaced by a solenoid. The controller 75 controls the driver 74C in accordance with a control signal from the artificial intelligence processor 64 to change the height of the electric adjustable seatpost 70C. The electric adjustable seatpost 70C includes an electric seatpost, in which the seatpost is extended or retracted by the force of the driver 74C, or a mechanical seatpost, in which the seatpost is extended with at least one of the force of a spring and pneumatic force controlled with a valve by the driver 74C and retracted using manual force. The mechanical seatpost includes a hydraulic seatpost or a hydraulic-pneumatic seatpost.

The electric suspension 70D includes at least one of a rear suspension and a front suspension. The electric suspension 70D absorbs an impact applied to the wheel. The electric suspension 70D can be a hydraulic suspension or an air suspension. The electric suspension 70D includes a first portion, and a second portion that is fitted to the first portion and movable relative to the first portion. The operational state of the electric suspension 70D includes a locked state, in which relative movement between the first portion and the second portion is restricted, and an unlocked state, in which relative movement between the first portion and the second portion is permitted. The electric suspension 70D includes the driver 74D. The driver 74D includes, for example, an electric motor and a drive circuit that controls the electric power supplied to the electric motor. The electric motor included in the driver 74D can be replaced by a solenoid. The driver 74D switches the operational state of the electric suspension 70D. The controller 75 controls the driver 74D in accordance with a control signal from the artificial intelligence processor 64 to change the operational state of the electric suspension 70D. The locked state of the electric suspension 70D can include a state where the first portion and the second portion slightly move relative to each other in a case where a strong force is applied to the wheel. Instead of or in addition to the locked state and the unlocked state, the operational state of the electric suspension 70D can further include at least one of a plurality of operational states with different damping forces and a plurality of operational states with different stroke amounts.

The rear suspension is configured to be provided on the frame 16 of the human-powered vehicle 10. More specifically, the rear suspension is provided between the frame body of the frame 16 and the swing arm that supports the rear wheel. The rear suspension absorbs an impact applied to the rear wheel. The front suspension is configured to be provided between the frame 16 of the human-powered vehicle 10 and the front wheel. More specifically, the front suspension is provided on the front fork 16A. The front suspension absorbs an impact applied to the front wheel.

The electric brake device 70E is configured to brake at least one of the front wheel and the rear wheel. The electric brake device 70E includes a driver 74E. The driver 74E includes, for example, an electric motor and a drive circuit that controls the electric power supplied to the electric motor. The electric brake device 70E includes at least one of a disc brake, a rim brake, a drum brake, and a roller brake. At least one of a disc brake, a rim brake, a drum brake, and a roller brake is driven by the driver 74E. The controller 75 controls the driver 74E in accordance with a control signal from the artificial intelligence processor 64 to change the operational state of the electric brake device 70E. The electric brake device 70E can include an electric motor for performing regenerative braking in addition to or instead of at least one of a disc brake, a rim brake, a drum brake, and a roller brake. The electric motor for performing the regenerative braking can be an electric motor included in the driver 74E of the drive device 70B.

The lamp 70F includes at least one of a front lamp and a tail lamp. The front lamp is attached to, for example, the front fork 16A or the handlebar 16C. The tail lamp is attached to, for example, a seat stay or a seatpost. The lamp 70F includes a driver 74F. The driver 74F includes a light emitting element and a drive circuit that controls the electric power supplied to the light emitting element. The controller 75 controls the driver 74F in accordance with a control signal from the artificial intelligence processor 64 to change the operational state of the lamp 70F. The operational state of the lamp 70F includes at least one of an activated state, an intermittently activated state, and a deactivated state.

The presentation device 70G includes a driver 74G. The presentation device 70G is provided, for example, on the handlebar 16C, the stem, or the frame 16. The driver 74G includes at least one of a display unit and a speaker. The presentation device 70G is configured by, for example, a cycle computer. The controller 75 controls the driver 74G in accordance with a control signal from the artificial intelligence processor 64 to change the operational state of the presentation device 70G.

The mobile electronic device 76 includes at least one of a vibration generator 76A, a display 76B, and a speaker 76C. The mobile electronic device 76 includes, for example, at least one of a smartphone and a tablet computer. The vibration generator 76A vibrates the housing of mobile electronic device 76. The display 76B includes at least one of a liquid crystal panel and an organic electro-luminescence (EL) panel. The display 76B can be a touch panel. Preferably, the mobile electronic device 76 further includes a communication unit 76D and a controller 76E. The mobile electronic device 76 further includes a battery that supplies power to each element included in the mobile electronic device 76. The communication unit 76D is configured to communicate with the output device 66 of the human-powered vehicle component 60. The communication unit 76D and the output device 66 can be connected to communicate through an electric cable or through wireless communication. The controller 76E includes a processing device that executes a predetermined control program. The processing device includes, for example, a CPU or an MPU. The controller 76E can include one or more microcomputers. The controller 76E can include a storage unit. The storage unit includes, for example, a nonvolatile memory and a volatile memory. The controller 76E controls the vibration generator 76A, the display 76B, and the speaker 76C.

Preferably, the input device 62 is configured to receive output information from the detection device 78. The detection device 78 is configured in a manner similar to the detection device 58 in accordance with the first embodiment. The first information includes the same information as the first information in accordance with the first embodiment. Specifically, the first information related to the human-powered vehicle 10 includes at least one of the transmission ratio of the human-powered vehicle 10, the vehicle speed of the human-powered vehicle 10, the rotational speed of the crank of the human-powered vehicle 10, the state of the operation device 30 of the human-powered vehicle 10, and the travel routes of the human-powered vehicle. The first information related to the rider of the human-powered vehicle 10 includes at least one of the human driving force that the rider of the human-powered vehicle 10 inputs to the human-powered vehicle 10, the state of the rider of the human-powered vehicle 10, and the information related to energy consumption of the rider of the human-powered vehicle 10. The first information related to the environment of the human-powered vehicle 10 includes at least one of weather information, map information, and traffic information.

A process for controlling at least one of the other human-powered vehicle component 70 and the mobile electronic device 76 in accordance with the first information will now be described with reference to FIG. 6. If the artificial intelligence processor 64 is supplied with electric power, the artificial intelligence processor 64 starts the process based on control program P1 and proceeds to step S21 of the flowchart shown in FIG. 6.

In step S21, the artificial intelligence processor 64 determines whether or not the first information has been input. Specifically, in a case where the first information has been input to the input device 62, the artificial intelligence processor 64 determines that the first information has been input. In a case where the first information has not been input, the artificial intelligence processor 64 ends the process. The artificial intelligence processor 64 proceeds to step S21 after a predetermined cycle has elapsed from the end of the flowchart shown in FIG. 6 until the supply of electric power is stopped. In a case where the first information has been input, the artificial intelligence processor 64 proceeds to step S22.

In step S22, the artificial intelligence processor 64 generates the third information in accordance with the first information and proceeds to step S23. In step S23, the artificial intelligence processor 64 transmits the third information to at least one of the other human-powered vehicle component 70 and the mobile electronic device 76 and then ends the process. At least one of the other human-powered vehicle component 70 and the mobile electronic device 76 operate in accordance with the received third information.

The storage 64A can include a learning program P2. The artificial intelligence processor 64 updates learning model M1 for generating the third information using the first information with a learning algorithm based on learning program P2. In this case, the artificial intelligence processor 64 operates in the learning mode and the control mode. In a case where the artificial intelligence processor 64 operates in the learning mode, the artificial intelligence processor 64 functions as a generation unit that generates learning model M1 with the learning algorithm based on learning program P2. In a case where the artificial intelligence processor 64 operates in the control mode, the artificial intelligence processor 64 functions as a controller that outputs the third information by processing the first information acquired by the detection device 58 using learning model M1 based on control program P1. The artificial intelligence processor 64 updates learning model M1 for generating the third information in accordance with, for example, the first information and the operation of the operation device 60F for operating the other human-powered vehicle component 70. In this case, the operation device 30 is connected to the human-powered vehicle component 70 to communicate with the human-powered vehicle component 70 through wired or wireless connection.

The artificial intelligence processor 64 can control the other human-powered vehicle component 70 in accordance with the preference of the rider by learning a combination of the operation of the operation device 60F and the first information in a case where the operation of the operation device 60F is performed.

Third Embodiment

Figure 7:
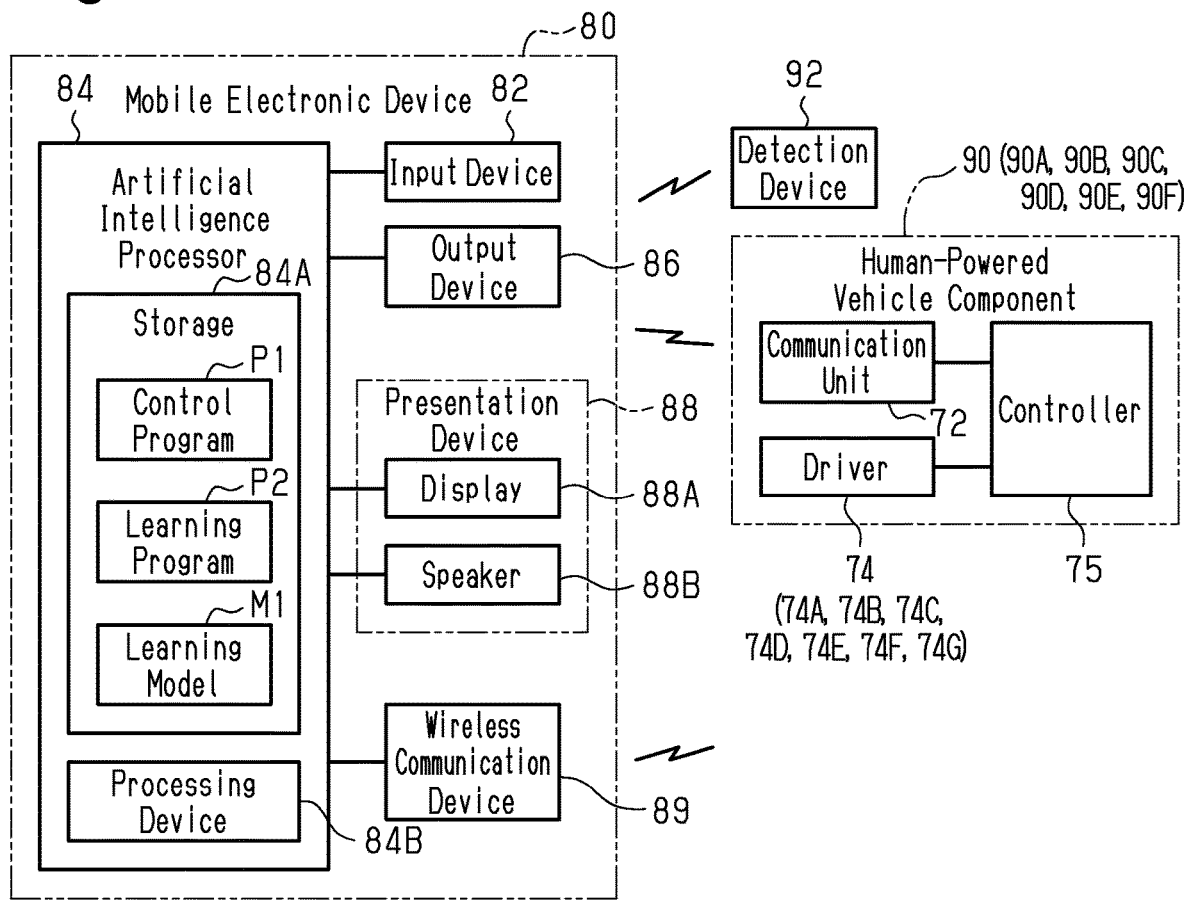
FIG. 7 is a block diagram showing an electrical configuration of a human-powered vehicle component and a mobile electronic device in accordance with a third embodiment.
Figure 8:
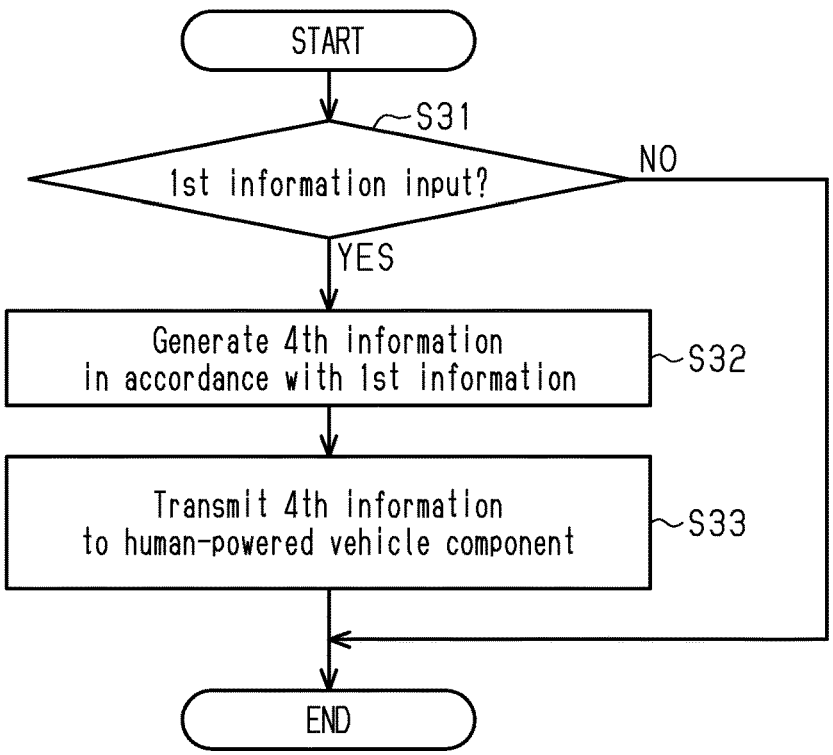
FIG. 8 is a flowchart of a process for generating fourth information in accordance with first information executed by an artificial intelligence processor of FIG. 7.
Figure 9:
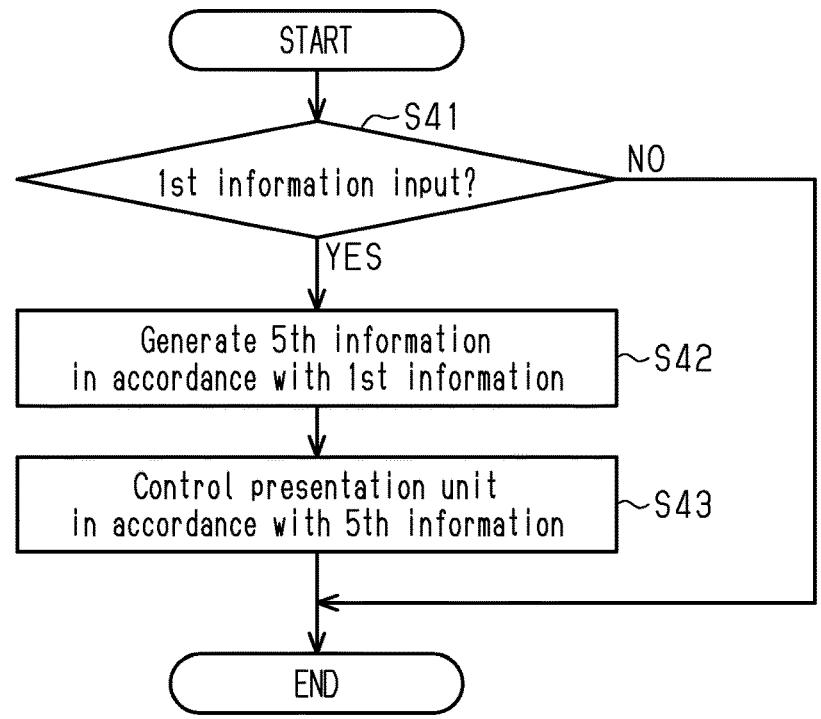
FIG. 9 is a flowchart of a process for generating fifth information in accordance with first information executed by an artificial intelligence processor of FIG. 7.

A mobile electronic device 80 in accordance with a third embodiment will now be described with reference to FIGS. 7 to 9. The mobile electronic device 80 in accordance with the third embodiment is applied to the human-powered vehicle 10 having the same configuration as the human-powered vehicle 10 in accordance with the first embodiment. In the present embodiment, same reference numerals are given to those components that are the same as the corresponding components of the first and second embodiments. Such components will not be described in detail.

The mobile electronic device 80 includes an input device 82 and an artificial intelligence processor 84. First information related to at least one of the human-powered vehicle 10, the rider of the human-powered vehicle 10, and the environment of the human-powered vehicle 10 is input to the input device 82. The artificial intelligence processor 84 generates fourth information for controlling a human-powered vehicle component 90 provided on the human-powered vehicle 10 in accordance with the first information input to the input device 82. The fourth information includes at least one of information related to an automatic transmission, information related to an assist force for assisting propulsion of the human-powered vehicle 10, information related to the height of a saddle, information related to the state of the suspension, information related to a brake, information related to a lamp, and information related to a content of a presentation that is presented to the rider of the human-powered vehicle 10. The mobile electronic device 80 further includes a battery that supplies power to each configuration included in the mobile electronic device 76.

The artificial intelligence processor 84 includes storage 84A storing software, and a processing device 84B that executes software stored in the storage 84A. The processing device 84B includes, for example, a CPU, or an MPU. Preferably, the processing device 84B includes a GPU in addition to the CPU or the MPU. The processing device 84B can include an FPGA. The artificial intelligence processor 84 can include one or more processing devices. The artificial intelligence processor 84 can include a plurality of processing devices 84B located at separate positions. The processing device 84B executes control program P1 and learning program P2 stored in storage 84A.

The storage 84A includes, for example, a nonvolatile memory and a volatile memory. The storage 84A stores control program P1 and learning model M1. In the present embodiment, learning model M1 is a learned model learned by a predetermined learning algorithm. The learning algorithm includes machine learning, deep learning or deep reinforcement learning. The learning algorithm includes, for example, at least one of supervised learning, unsupervised learning, and reinforcement learning. As a learning algorithm, methods other than the method described in the present specification can be used as long as learning model M1 can be updated using a method belonging to the field of artificial intelligence. Preferably, the learning process for updating learning model M1 is performed by the GPU. The learning algorithm uses a neural network. The learning algorithm can use a recurrent neural network. The artificial intelligence processor 84 outputs the third information by processing the first information acquired by a detection device 92 using learning model M1 based on control program P1.

Preferably, the input device 82 is configured to receive the first information through wireless communication. The input device 82 includes, for example, a wireless communication device that performs communication through radio waves or infrared rays.

Preferably, the mobile electronic device 80 further includes an output device 86 configured to output the fourth information. The output device 86 is configured to output the fourth information through wireless communication. The output device 86 includes, for example, a wireless communication device that performs communication through radio waves or infrared rays. The output device 86 is configured to output the fourth information to the human-powered vehicle component 90. The input device 82 and the output device 86 can be configured by a common wireless communication device. Preferably, the wireless communication devices included in the input device 82 and the output device 86 are configured to perform short distance wireless communication. The wireless communication devices included in the input device 82 and the output device 86 communicate through a short-range wireless technology standard such as, for example, at least one of ANT+ and BLUETOOTH.

Preferably, the mobile electronic device 80 further includes a wireless communication device 89 connectable to a public communication network. The wireless communication device 89 is configured to communicate with a wireless base station of a public network through radio waves.

The human-powered vehicle component 90 includes at least one of an electric transmission 90A, a drive device 90B that assists propulsion of the human-powered vehicle 10, an electric adjustable seatpost 90C, an electric suspension 90D, an electric brake device 90E, and a lamp 90F.

The electric transmission 90A has the same configuration as the electric transmission 70A in accordance with the second embodiment. The drive device 90B has the same configuration as the drive device 70B in accordance with the second embodiment. The electric adjustable seatpost 90C has the same configuration as the electric adjustable seatpost 70C in accordance with the second embodiment. The electric suspension 90D has the same configuration as the electric suspension 70D in accordance with the second embodiment. The electric brake device 90E has the same configuration as the electric brake device 70E in accordance with the second embodiment. The lamp 90F has the same configuration as the lamp 70F in accordance with the second embodiment. The communication unit 72 receives a control signal from the artificial intelligence processor 84 and outputs the control signal to the controller 75. The controller 75 controls the driver 74 in accordance with a control signal from the artificial intelligence processor 84 received by the communication unit 72.

The input device 82 is configured to receive output information from the detection device 92. The detection device 92 is configured in the same manner as the detection device 58 in accordance with the first embodiment. The first information includes the same information as the first information in accordance with the first embodiment. Specifically, the first information related to the human-powered vehicle 10 includes at least one of the transmission ratio of the human-powered vehicle 10, the vehicle speed of the human-powered vehicle 10, the rotational speed of the crank of the human-powered vehicle 10, the state of the operation device 30 of the human-powered vehicle 10, and the travel routes of the human-powered vehicle. The first information related to the rider of the human-powered vehicle 10 includes at least one of the human driving force that the rider of the human-powered vehicle 10 inputs to the human-powered vehicle 10, the state of the rider of the human-powered vehicle 10, and the information related to energy consumption of the rider of the human-powered vehicle 10. The first information related to the environment of the human-powered vehicle 10 includes at least one of weather information, map information, and traffic information.

The process for controlling the human-powered vehicle component 90 in accordance with the first information will now be described with reference to FIG. 8. If the artificial intelligence processor 84 is supplied with electric power, the artificial intelligence processor 84 starts the process based on control program P1 and proceeds to step S31 of the flowchart shown in FIG. 8.

In step S31, the artificial intelligence processor 84 determines whether or not the first information has been input. Specifically, in a case where the first information has been input to the input device 82, the artificial intelligence processor 84 determines that the first information has been input. In a case where the first information has not been input, the artificial intelligence processor 84 ends the process. The artificial intelligence processor 84 proceeds to step S31 after a predetermined cycle has elapsed from the end of the flowchart shown in FIG. 8 until the supply of electric power is stopped. In a case where the first information has been input, the artificial intelligence processor 84 proceeds to step S32.

In step S32, the artificial intelligence processor 84 generates the fourth information in accordance with the first information and then proceeds to step S33. In step S33, the artificial intelligence processor 84 transmits the fourth information to the human-powered vehicle component 90 and then ends the process. The human-powered vehicle component 90 operates in accordance with the received fourth information.

The storage 84A can include a learning program P2. The artificial intelligence processor 84 updates learning model M1 for generating the fourth information using the first information with a learning algorithm based on learning program P2. In this case, the artificial intelligence processor 84 operates in the learning mode and the control mode. In a case where the artificial intelligence processor 84 operates in the learning mode, the artificial intelligence processor 84 functions as a generation unit that generates learning model M1 with the learning algorithm based on learning program P2. In a case where the artificial intelligence processor 84 operates in the control mode, the artificial intelligence processor 84 functions as a controller that outputs the fourth information by processing the first information acquired by the detection device 92 using learning model M1 based on control program P1. The artificial intelligence processor 84 updates learning model M1 for generating the fourth information in accordance with, for example, the first information and the operation of the operation device 30 for operating the human-powered vehicle component 90. In this case, the operation device 30 is connected to the human-powered vehicle component 90 to communicate with the human-powered vehicle component 40 through wired or wireless connection and also connected to the mobile electronic device 80 through wireless connection.

The artificial intelligence processor 84 can control the human-powered vehicle component 90 in accordance with the preference of the rider by learning a combination of the operation of the operation device 30 and the first information in a case where the operation of the operation device 30 is performed.

The mobile electronic device 80 further includes a presentation device 88, and the artificial intelligence processor 84 can generate fifth information for controlling the presentation device 88 in accordance with the first information input to the input device 82. The fifth information is information related to the content of presentation that is presented to the rider of the human-powered vehicle 10. The information related to a content of a presentation includes at least one of, for example, information related to the optimum transmission ratio, information related to a shift timing, information related to an optimum operation mode of the drive device, information related to a timing to change the operation mode of the drive device, information related to the optimum height of the saddle, information related to a timing to change the height of the saddle, information related to the optimum operational state of the suspension, information related to a timing to change the operational state of the suspension, information related to an optimum braking force, information related to a brake timing, information related to an optimum operational state of the lamp, information related to a timing to change the operational state of the lamp, and information related to a travel route of the human-powered vehicle 10. The presentation device 88 includes at least one of a display 88A and a speaker 88B. The display 88A includes at least one of a liquid crystal panel and an organic EL panel. The display 88A can be a touch panel.

A process for controlling the presentation device 88 in accordance with the first information will now be described with reference to FIG. 9. If the artificial intelligence processor 84 is supplied with electric power, the artificial intelligence processor 84 starts the process and proceeds to step S41 of the flowchart shown in FIG. 9.

In step S41, the artificial intelligence processor 84 determines whether or not the first information has been input. Specifically, in a case where the first information has been input to the input device 82, the artificial intelligence processor 84 determines that the first information has been input. The artificial intelligence processor 84 proceeds to step S41 after a predetermined cycle has elapsed from the end of the flowchart shown in FIG. 9 until the supply of electric power is stopped. In a case where the first information has not been input, the artificial intelligence processor 84 ends the process. In a case where the first information has been input, the artificial intelligence processor 84 proceeds to step S42.

In step S42, the artificial intelligence processor 84 generates the fifth information in accordance with the first information and then proceeds to step S43. In step S43, the artificial intelligence processor 84 controls the presentation device 88 in accordance with the fifth information and then ends the process.

Fourth Embodiment

Figure 10:
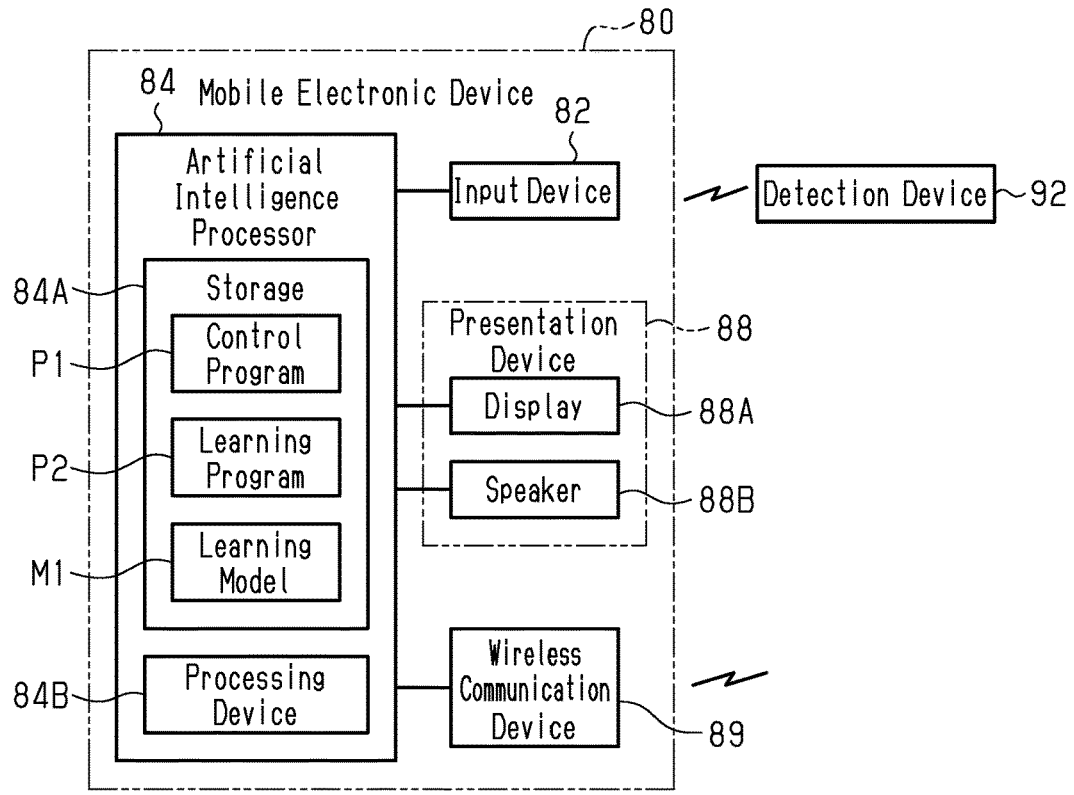
FIG. 10 is a block diagram showing an electrical configuration of a mobile electronic device in accordance with a fourth embodiment.
Figure 11:
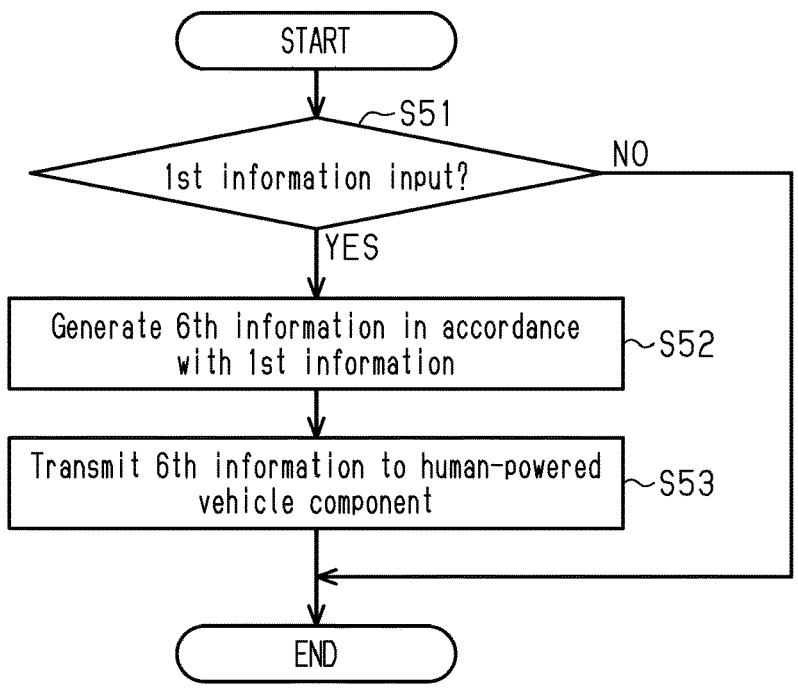
FIG. 11 is a flowchart of a process for generating sixth information in accordance with first information executed by an artificial intelligence processor of FIG. 10.

A mobile electronic device 80 in accordance with a fourth embodiment will now be described with reference to FIGS. 10 and 11. The mobile electronic device 80 in accordance with the fourth embodiment is the same as the mobile electronic device 80 in accordance with the third embodiment except in that sixth information is generated in accordance with the first information. In the present embodiment, same reference numerals are given to those components that are the same as the corresponding components of the third embodiment. Such components will not be described in detail.

The mobile electronic device 80 includes an input device 82, a presentation device 88, and an artificial intelligence processor 84. First information related to at least one of the human-powered vehicle 10, the rider of the human-powered vehicle 10, and the environment of the human-powered vehicle 10 is input to the input device 82. The artificial intelligence processor 84 generates the sixth information for controlling the presentation device 88 in accordance with the first information input to the input device 82. The mobile electronic device 80 in accordance with the fourth embodiment can omit the output device 86 in accordance with the third embodiment. The sixth information is similar to the fifth information.

A process for controlling the presentation device 88 in accordance with the first information will now be described with reference to FIG. 11. If the artificial intelligence processor 84 is supplied with electric power, the artificial intelligence processor 84 starts the process and proceeds to step S51 of the flowchart shown in FIG. 11.

In step S51, the artificial intelligence processor 84 determines whether or not the first information has been input. Specifically, in a case where the first information has been input to the input device 82, the artificial intelligence processor 84 determines that the first information has been input. The artificial intelligence processor 84 proceeds to step S51 after a predetermined cycle has elapsed from the end of the flowchart shown in FIG. 11 until the supply of electric power is stopped. In a case where the first information has not been input, the artificial intelligence processor 84 ends the process. In a case where the first information has been input, the artificial intelligence processor 84 proceeds to step S52.

In step S52, the artificial intelligence processor 84 generates the sixth information in accordance with the first information and then proceeds to step S53. In step S53, the artificial intelligence processor 84 controls the presentation device 88 in accordance with the sixth information and then ends the process.

MODIFIED EXAMPLES

The description related with the above embodiments exemplifies, without any intention to limit, an applicable form of a human-powered vehicle component and a mobile electronic device in accordance with the present disclosure. In addition to the embodiments described above, the human-powered vehicle component and the mobile electronic device in accordance with the present disclosure is applicable to, for example, modified examples of the above embodiments that are described below and combinations of at least two of the modified examples that do not contradict each other. In the modified examples described hereafter, same reference numerals are given to those components that are the same as the corresponding components of the above embodiments. Such components will not be described in detail.

Figure 12:
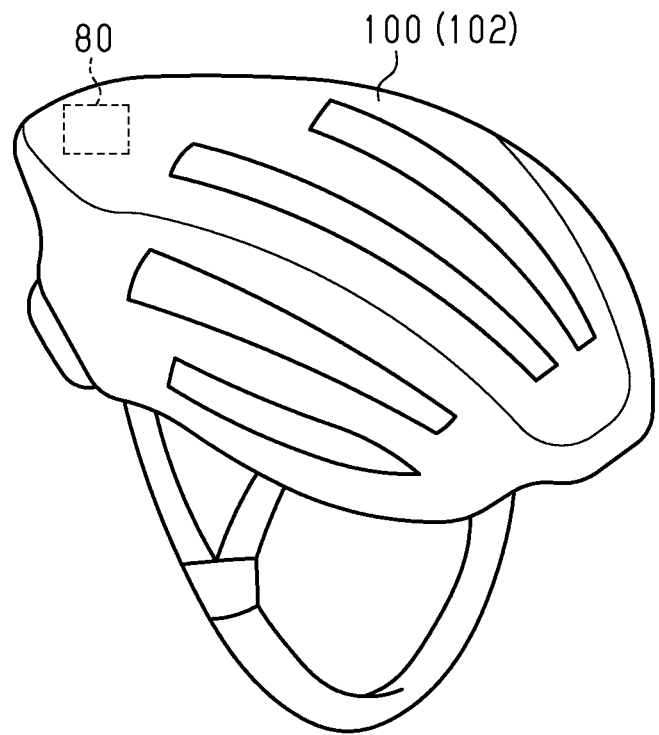
FIG. 12 is a perspective view of a helmet provided with the mobile electronic device in accordance with the fourth embodiment.
Figure 13:
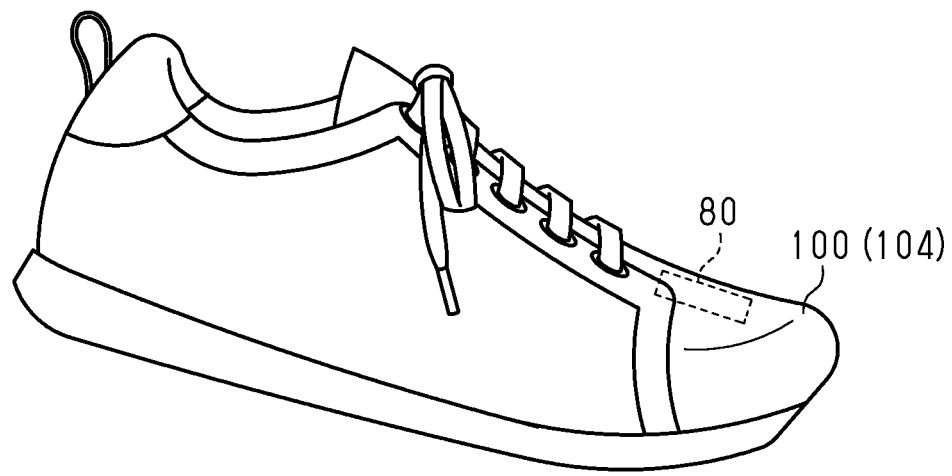
FIG. 13 is a perspective view of a shoe provided with the mobile electronic device in accordance with the fourth embodiment.

The mobile electronic device 80 in accordance with the third and fourth embodiments can be included in equipment 100 for the human-powered vehicle 10. The equipment for the human-powered vehicle 10 includes a helmet 102 of FIG. 12 and a shoe 104 of FIG. 13 on which the mobile electronic device 80 is provided.

Figure 14:
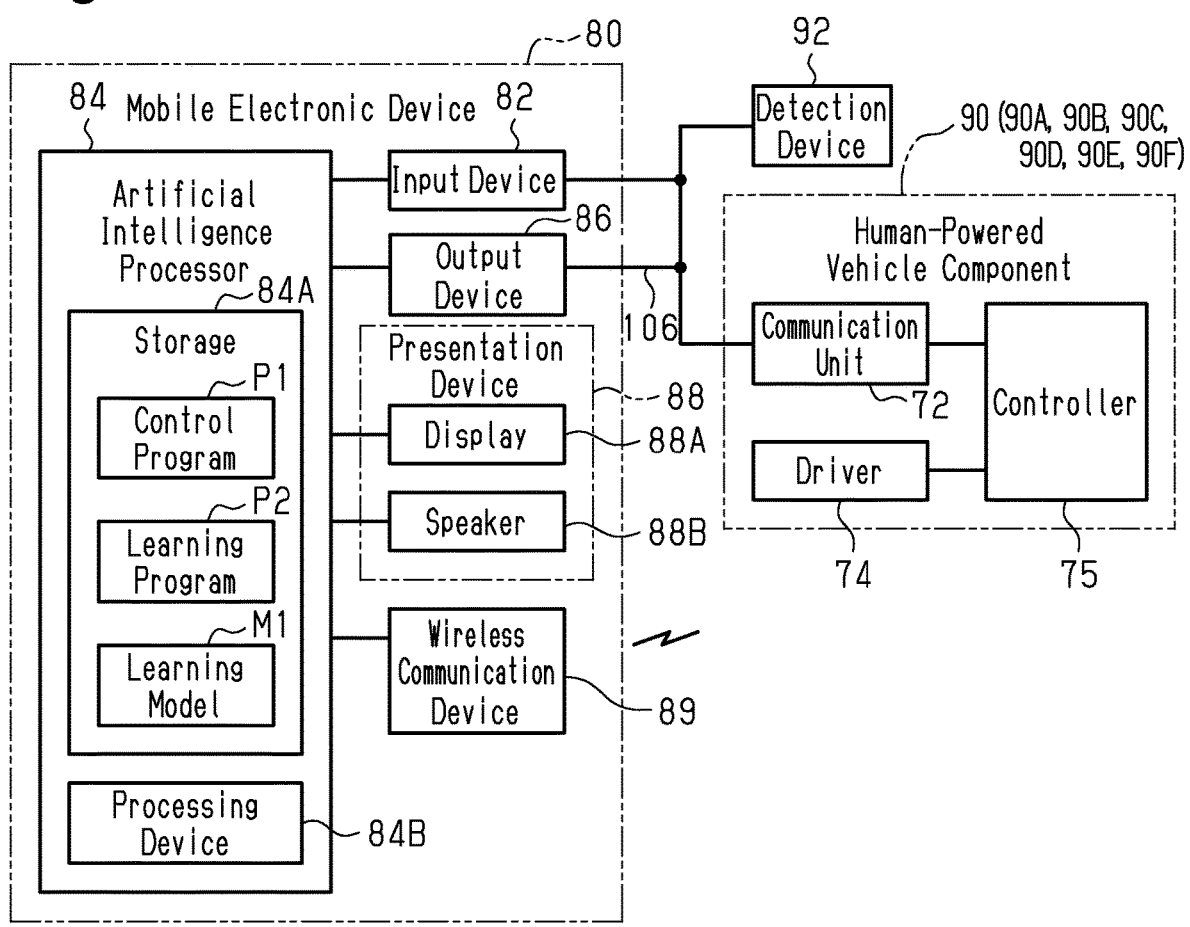
FIG. 14 is a block diagram showing an electrical configuration of a human-powered vehicle component and a mobile electronic device in accordance with a modified example.

The output device 86 in accordance with the third and fourth embodiments can be configured to output the fourth information through an electric cable 106 connected to the human-powered vehicle component 90 as shown in FIG. 14.

In a case where the learned learning model M1 is stored in the storages 46A, 64A, 84A, learning program P2 can be omitted. In this case, the artificial intelligence processors 46, 64, 84 operate only in the control mode.

DESCRIPTION OF REFERENCE CHARACTERS 10) human-powered vehicle, 12) crank, 28, 60I) battery device, 30, 60F) operation device, 40) human-powered vehicle component, 42) input device, 44, 48A, 50A, 52A, 54A, 56A) electric actuator, 46, 64, 84) artificial intelligence processor, 46A, 64A, 84A) storage, 46B, 64B, 84B) processing device, 48, 60A, 70A, 90A) electric transmission, 50, 60B, 70B, 90B) drive device, 52, 70C, 90C) electric adjustable seatpost, 54, 70D, 90D) electric suspension, 56, 70E, 90E) electric brake device, 60) human-powered vehicle component, 60C) seatpost, 60D) suspension, 60E) brake device, 60G, 70F, 90F) lamp, 62) input device, 66) output device, 70) another human-powered vehicle component, 70G) presentation device, 76) mobile electronic device, 76A) vibration generator, 76B, 88A) display, 76C, 88B) speaker, 76E) controller, 80) mobile electronic device, 82) input device, 86) output device, 88) presentation device, 89) wireless communication device, 90) human-powered vehicle component, 100) equipment for human-powered vehicle, 102) helmet, 104) shoe, 106) electric cable

The invention claimed is:

1. A human-powered vehicle component comprising:
an input device to which first information related to at least one of a human-powered vehicle, a rider of the human-powered vehicle, and environment of the human-powered vehicle is input;
an electric actuator; and
an artificial intelligence processor including memory in which a learning model and a learning program are stored, wherein
the electric actuator is configured to drive at least one of an electric transmission, a drive device for assisting propulsion of the human-powered vehicle, an electric suspension, and an electric brake device,
the artificial intelligence processor is configured to generate second information for controlling the electric actuator in accordance with the first information input to the input device, and
the artificial intelligence processor is configured to update the learning model for generating the second information using the first information with a learning algorithm based on the learning program.

2. The human-powered vehicle component according to claim 1, wherein the second information includes at least one of information related to an automatic transmission, information related to an assist force for assisting propulsion of the human-powered vehicle, information related to a state of a suspension, and information related to a brake.

3. The human-powered vehicle component according to claim 1, wherein the first information related to the human-powered vehicle includes at least one of a transmission ratio of the human-powered vehicle, a vehicle speed of the human-powered vehicle, a rotational speed of a crank of the human-powered vehicle, a state of an operation device of the human-powered vehicle, and a travel route of the human-powered vehicle.

4. The human-powered vehicle component according to claim 1, wherein the first information related to the rider of the human-powered vehicle includes at least one of a human driving force input to the human-powered vehicle by the rider of the human-powered vehicle, a state of the rider of the human-powered vehicle, and information related to energy consumption of the rider of the human-powered vehicle.

5. The human-powered vehicle component according to claim 1, wherein the first information related to the environment of the human-powered vehicle includes at least one of weather information, map information, and traffic information.

6. A human-powered vehicle component comprising:
an input device to which first information related to at least one of a human-powered vehicle, a rider of the human-powered vehicle, and environment of the human-powered vehicle is input;
an electric actuator; and
an artificial intelligence processor including memory in which a learning model and a learning program are stored, wherein
the electric actuator is configured to drive at least one of an electric transmission, a drive device for assisting propulsion of the human-powered vehicle, an electric suspension, and an electric brake device,
the artificial intelligence processor is configured to generate third information for controlling at least one of an other human-powered vehicle component provided on the human-powered vehicle and a mobile electronic device carried by the rider of the human-powered vehicle in accordance with the first information input to the input device, and
the artificial intelligence processor is configured to update the learning model for generating the third information using the first information with a learning algorithm based on the learning program.

7. The human-powered vehicle component according to claim 6, wherein the third information includes at least one of information related to an automatic transmission, information related to an assist force for assisting propulsion of the human-powered vehicle, information related to a state of a suspension, information related to a brake, information related to a lamp, and information related to a content of a presentation that is presented to the rider of the human-powered vehicle.

8. The human-powered vehicle component according to claim 6, wherein the mobile electronic device includes at least one of a vibration generator, a display, and a speaker.

9. The human-powered vehicle component according to claim 6, wherein the human-powered vehicle component is the electric transmission, the drive device for assisting propulsion of the human-powered vehicle, the electric suspension, the electric brake device, an operation device, a lamp, a presentation device, or a battery device.

\* \* \* \* \*